(12) United States Patent
Jiang et al.

(10) Patent No.: US 10,558,022 B2
(45) Date of Patent: Feb. 11, 2020

(54) OPTICAL LENS AND FABRICATION METHOD THEREOF

(71) Applicant: Rays Optics Inc., Hukou Township, Hsinchu County (TW)

(72) Inventors: Sheng-Da Jiang, Hukou Township, Hsinchu County (TW); Ching-Sheng Chang, Hukou Township, Hsinchu County (TW); Hsin-Te Chen, Hukou Township, Hsinchu County (TW); Kuo-Chuan Wang, Hukou Township, Hsinchu County (TW)

(73) Assignee: RAYS OPTICS INC., Hsinchu County (TW)

( * ) Notice: Subject to any disclaimer, the term of this patent is extended or adjusted under 35 U.S.C. 154(b) by 29 days.

(21) Appl. No.: 15/959,879

(22) Filed: Apr. 23, 2018

(65) Prior Publication Data

US 2019/0204569 A1 Jul. 4, 2019

(30) Foreign Application Priority Data

Dec. 29, 2017 (TW) .............................. 106146530 A

(51) Int. Cl.
| | | |
|---|---|---|
| *G02B 9/04* | (2006.01) | |
| *G02B 13/14* | (2006.01) | |
| *G02B 13/06* | (2006.01) | |
| *G02B 13/18* | (2006.01) | |
| *G02B 9/64* | (2006.01) | |

(52) U.S. Cl.
CPC ............. *G02B 13/06* (2013.01); *G02B 9/64* (2013.01); *G02B 13/14* (2013.01); *G02B 13/18* (2013.01)

(58) Field of Classification Search
None
See application file for complete search history.

(56) References Cited

U.S. PATENT DOCUMENTS

| | | | |
|---|---|---|---|
| 8,134,787 B2 | 3/2012 | Saitoh | |
| 2009/0034101 A1* | 2/2009 | Hsu ...................... | G02B 13/06 359/793 |
| 2014/0078605 A1* | 3/2014 | Ohashi ............... | G02B 13/0045 359/754 |
| 2014/0293441 A1* | 10/2014 | Inomoto ................ | G02B 13/04 359/708 |

(Continued)

FOREIGN PATENT DOCUMENTS

| | | |
|---|---|---|
| CN | 104007535 A | 8/2014 |
| CN | 204536640 U | 8/2015 |

(Continued)

*Primary Examiner* — Darryl J Collins
(74) *Attorney, Agent, or Firm* — Muncy, Geissler, Olds & Lowe, P.C.

(57) ABSTRACT

An optical lens includes a first lens group with a negative refractive power, a second lens group with a positive refractive power, and an aperture stop disposed between the first lens group and the second lens group. The second lens group is disposed between the first lens group and the second side. The optical lens satisfies the conditions: 2.1<D1/D3<3.0 and 1.9<D1/DL<3.2, where D1 is a diameter of a surface of the first lens facing the first side, D3 is a diameter of a surface of the third lens facing the first side, DL is a diameter of a surface of a last lens facing the second side, and the last lens is nearest the second side as compared with any other lens of the optical lens.

20 Claims, 19 Drawing Sheets

(56) References Cited

U.S. PATENT DOCUMENTS

2017/0184814 A1    6/2017  Ning
2017/0235120 A1*   8/2017  Williamson .......... H04N 13/257
                                                              348/45
2017/0307857 A1   10/2017  Ning

FOREIGN PATENT DOCUMENTS

CN    105892024 A    8/2016
CN    206020797 U    3/2017

* cited by examiner

OPTICAL LENS AND FABRICATION METHOD THEREOF

BACKGROUND OF THE INVENTION a. Field of the Invention

The invention relates to an optical lens and a fabrication method of the optical lens.

b. Description of the Related Art

Recent advances in technology have led to the development of various types of optical lenses. A wide angle lens is a commonly used optical imaging device. An optical lens having a full field of view (FOV) of greater than 180 degrees is typically called a fisheye lens or a panoramic lens. Nowadays, there is a growing need for an optical lens to become thinner and have high optical performance. To meet these requirements, the optical lens needs to have low fabrication costs, high effective aperture, wide viewing angles, light weight and 24-hours confocal image-capturing capability. Therefore, it is desirable to provide an optical lens that may achieve lighter weight, lower fabrication costs, good imaging quality and 24-hours confocal image-capturing capability.

BRIEF SUMMARY OF THE INVENTION

According to one aspect of the present disclosure, an optical lens includes a first lens group with a negative refractive power, a second lens group with a positive refractive power, and an aperture stop disposed between the first lens group and the second lens group. The first lens group includes, in order from a first side to a second side, a first lens with a negative refractive power, a second lens with a refractive power and a third lens with a negative refractive power. The second lens group is disposed between the first lens group and the second side. The optical lens has at most nine lenses with refractive powers and satisfies the conditions: $2.1<D1/D3<3.0$ and $1.9<D1/DL<3.2$, where D1 is a diameter of a surface of the first lens facing the first side, D3 is a diameter of a surface of the third lens facing the first side, DL is a diameter of a surface of a last lens facing the second side, and the last lens is nearest the second side as compared with any other lens of the optical lens.

According to another aspect of the present disclosure, an optical lens includes, in order from a magnified side to a minified side, a first lens group, an aperture stop and a second lens group. The first lens group has a negative refractive power, and the second lens group has a positive refractive power. The first lens group includes a first lens with a negative refractive power, a second lens with a refractive power and a third lens with a negative refractive power, and the first lens is nearest the magnified side. The optical lens has at most nine lenses with refractive powers that include at most three aspheric lenses, and the optical lens satisfies the conditions: $0.146<IH/TTL<0.174$ and $0.023<IH/FOV<0.026$, where IH is a semi-diagonal image height on an image plane that equals half of an image circle, TTL is a total track length that is a distance along an optical axis between a surface of the first lens facing the magnified side and a surface of a last lens facing the minified side, the last lens is nearest the minified side as compared with any other lens of the optical lens, and FOV is a full field of view of the optical lens.

According to the above embodiments, the optical lens may achieve lighter weight, lower fabrication costs, good imaging quality and 24-hours confocal image-capturing capability in a limited layout space.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting.

Further, "First," "Second," etc, as used herein, are used as labels for nouns that they precede, and do not imply any type of ordering (e.g., spatial, temporal, logical, etc.).

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an image-pickup system, a magnified side may refer to one side of an optical path of an optical lens comparatively near a subject to be picked-up, and a minified side may refer to other side of the optical path comparatively near a photosensor.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
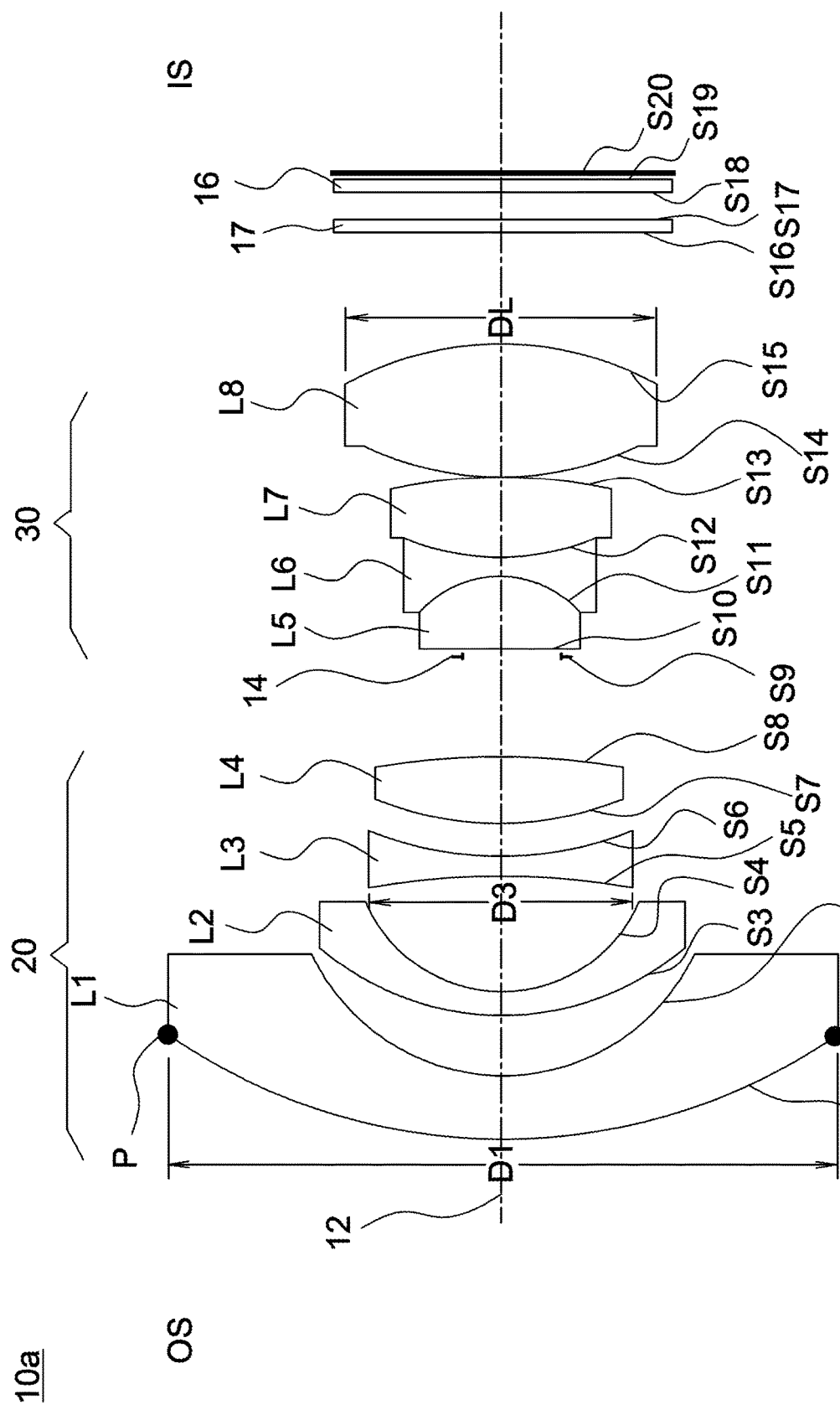
FIG. 1 shows a cross-sectional illustration of an optical lens according to an embodiment of the invention.

FIG. 1 shows a cross-sectional illustration of an optical lens according to an embodiment of the invention. As shown in FIG. 1, in this embodiment, the optical lens 10 has a lens barrel (not shown), and inside the lens barrel a first lens L1, a second lens L2, a third lens L3, a fourth lens L4, an aperture stop 14, a fifth lens L5, a sixth lens L6, a seventh lens L7 and a eighth lens L8 are arranged in order from a first side (magnified side OS) to a second side (minified side IS). The first lens L1, the second lens L2, the third lens L3 and the fourth lens L4 form a first lens group 20 (such as a front lens group) with a negative refractive power, and the fifth lens L5, the sixth lens L6, the seventh lens L7 and the eighth lens L8 form a second lens group 30 (such as a rear lens group) with a positive refractive power. Further, the minified side IS may be disposed with a cover glass 16, an IR (infrared) filter 17 and a photosensor (not shown), an image plane of the optical lens 10 formed at an effective focal length for visible light is labeled as S20, and the cover glass 16 is disposed between the second lens group 30 and the image plane S20 for visible light. In this embodiment, the refractive powers of the first lens L1 to the eighth lens L8 are negative, negative, negative, positive, positive, negative, positive and positive, and the third lens L3 and the eighth lens L8 are aspheric lenses. In one embodiment, adjoining surfaces of each two adjacent lenses may have an identical or a similar radius of curvature and are fit together to form a doublet lens or a triplet lens. For example, in this embodiment, the fifth lens L5, the sixth lens L6 and the seventh lens L7 are fit together to form a triplet lens, but the invention is not limited thereto. Note that adjoining surfaces of each two adjacent lenses in a doublet or triplet lens have an identical or a similar radius of curvature and can be fit together by various ways. For example, the lenses may be cemented together by applying an optical adhesive on two lens surfaces facing each other or stacked and then pressed to be fitted with each other. In each of the following embodiments, the magnified side OS is located on the left side and the minified side IS is located on the right side of each figure, and thus this is not repeatedly described in the following for clarity.

The aperture stop may be an independent component or integrally formed with other optical element. In this embodiment, the aperture stop may use a mechanic piece to block out peripheral light and transmit central light to achieve aperture effects. The mechanic piece may be adjusted by varying its position, shape or transmittance. In other embodiment, the aperture stop may be formed by applying an opaque or a light-absorbing material on a lens surface except for a central area to block out peripheral light and transmits central light.

In this embodiment, each aspheric lens is made from plastic. In other embodiment, each aspheric lens may be made from glass molding. A lens surface of each lens may be assigned a parameter of "diameter". For example, as shown in FIG. 1, a diameter D1 of a surface of the lens L1 facing the magnified side is a distance between opposite turning points P and Q measured in a direction perpendicular to the optical axis 12.

Detailed optical data and design parameters of the optical lens 10a are shown in Table 1 below. Note the data provided below are not used for limiting the invention, and those skilled in the art may suitably modify parameters or settings of the following embodiment with reference of the invention without departing from the scope or spirit of the invention.

TABLE 1

F/# = 1.9; TTL = 27.802 (mm)
IH/FOV = 0.02435; IH/TTL = 0.1617

| surface | radius of curvature (mm) | interval (mm) | refractive index | Abbe number | object description |
|---|---|---|---|---|---|
| S1 | 15.2 | 1.5 | 2.0 | 19.3 | L1 |
| S2 | 5.6 | 1.9 | | | |
| S3 | 7.9 | 0.5 | 1.9 | 40.8 | L2 |
| S4 | 3.9 | 3.2 | | | |
| S5* | −16.0 | 0.5 | 1.5 | 64.1 | L3 |
| S6* | 8.0 | 0.9 | | | |
| S7 | 9.7 | 1.8 | 2.0 | 19.3 | L4 |
| S8 | −14.4 | 2.8 | | | |
| S9 | INF | 0.2 | | | aperture stop |
| S10 | −155.3 | 1.9 | 1.7 | 55.5 | L5 |
| S11 | −3.0 | 0.5 | 1.8 | 26.5 | L6 |
| S12 | 6.5 | 2.3 | 1.6 | 63.3 | L7 |
| S13 | −8.5 | 0.1 | | | |
| S14* | 8.1 | 3.3 | 1.5 | 81.5 | L8 |
| S15* | −9.3 | 5.0 | | | |
| S16 | INF | 0.3 | 1.5 | 64.1 | IR filter |
| S17 | INF | 0.6 | | | |
| S18 | INF | 0.5 | 1.5 | 64.1 | cover glass |
| S19 | INF | 0.05 | | | |
| S20 | | | | | image plane |

In the above Table 1, the field heading "interval" represents a distance between two adjacent surfaces along the optical axis 12 of the optical lens 10a. For example, an interval of the surface S1 is a distance between the surface S1 and the surface S2 along the optical axis 12. Further, the interval, refractive index and Abbe number of any lens listed in the column of "Object description" show values in a horizontal row aligned with the position of that lens. Moreover, in table 1, the surfaces S1 and S2 are two lens surfaces of the first lens L1, the surfaces S3 and S4 are two lens surfaces of the second lens L2, and the remaining lens surfaces are classified by analogy so that related descriptions are omitted for sake of brevity. The aperture stop 14 is designated by the surface S5, and the surfaces S16 and S17 are two surfaces of the IR filter 17. The surface 18 is a surface of the cover glass 18 facing the magnified side OS, and the image plane of the optical lens 10a is designated by the surface S20. Further, in this embodiment, the diameter of the surface S1 is 18 mm, the diameter of the surface S5 is 7.2 mm, and the diameter of the surface S15 is 8.6 mm.

In the above table, the surface denoted by an asterisk is an aspheric surface, and a surface without the denotation of an asterisk is a spherical surface.

The radius of curvature is a reciprocal of the curvature. When the curvature is positive, the center of a lens surface is located towards the minified side. When the curvature is negative, the center of a lens surface is located towards the magnified side. The concavity and convexity of each lens surface is listed in the above table and shown in corresponding figures.

The Symbol F/# shown in the above table is an F-number of the aperture stop. When the optical lens is used in an optical projection system, the image plane is provided on a light valve, and, when the optical lens is used in an image pick-up system, the image plane is a sensing surface of a photosensor.

When the optical lens is used in an image pick-up system, the image circle refers to a diagonal length of an image on an image plane, and a semi-diagonal image height equals half of the image circle.

A total track length of the optical lens 10a is denoted as "TTL" in the above table. Specifically, the total track length TTL is a distance along the optical axis 12 between a lens surface S1 nearest the magnified side and the image plane S20.

In this embodiment, FOV denoted in the above table is an angle made between an optical surface nearest the magnified side and the optical axis of the optical lens, i.e., a full field of view measured diagonally.

In the following design examples of the invention, each aspheric surface satisfies the following equation:

$$Z = \frac{cr^2}{1+\sqrt{1-(1+k)c^2r^2}} + \sum_{i=1}^{N} \alpha_i r^i,$$

where Z denotes a sag of an aspheric surface along the optical axis, c denotes a reciprocal of a radius of an osculating sphere, K denotes a Conic constant, r denotes a height of the aspheric surface measured in a direction perpendicular to the optical axis, and $\alpha_i$ denotes aspheric coefficients of each order. Table 2 lists aspheric coefficients and conic constant of each aspheric surface of the optical lens according to the first embodiment of the invention.

TABLE 2

|  | S5 | S6 | S14 | S15 |
|---|---|---|---|---|
| k | 0 | 0 | 0 | 0 |
| $\alpha_4$ | −8.0E−05 | 1.8E−04 | −6.5E−04 | 2.6E−04 |
| $\alpha_6$ | −3.5E−05 | −5.3E−05 | −2.9E−06 | −2.3E−05 |
| $\alpha_8$ | 7.8E−07 | 1.2E−06 | 1.8E−07 | 1.4E−06 |
| $\alpha_{10}$ | 0.0E+00 | 0.0E+00 | −4.8E−08 | −7.4E−08 |

Figure 2:
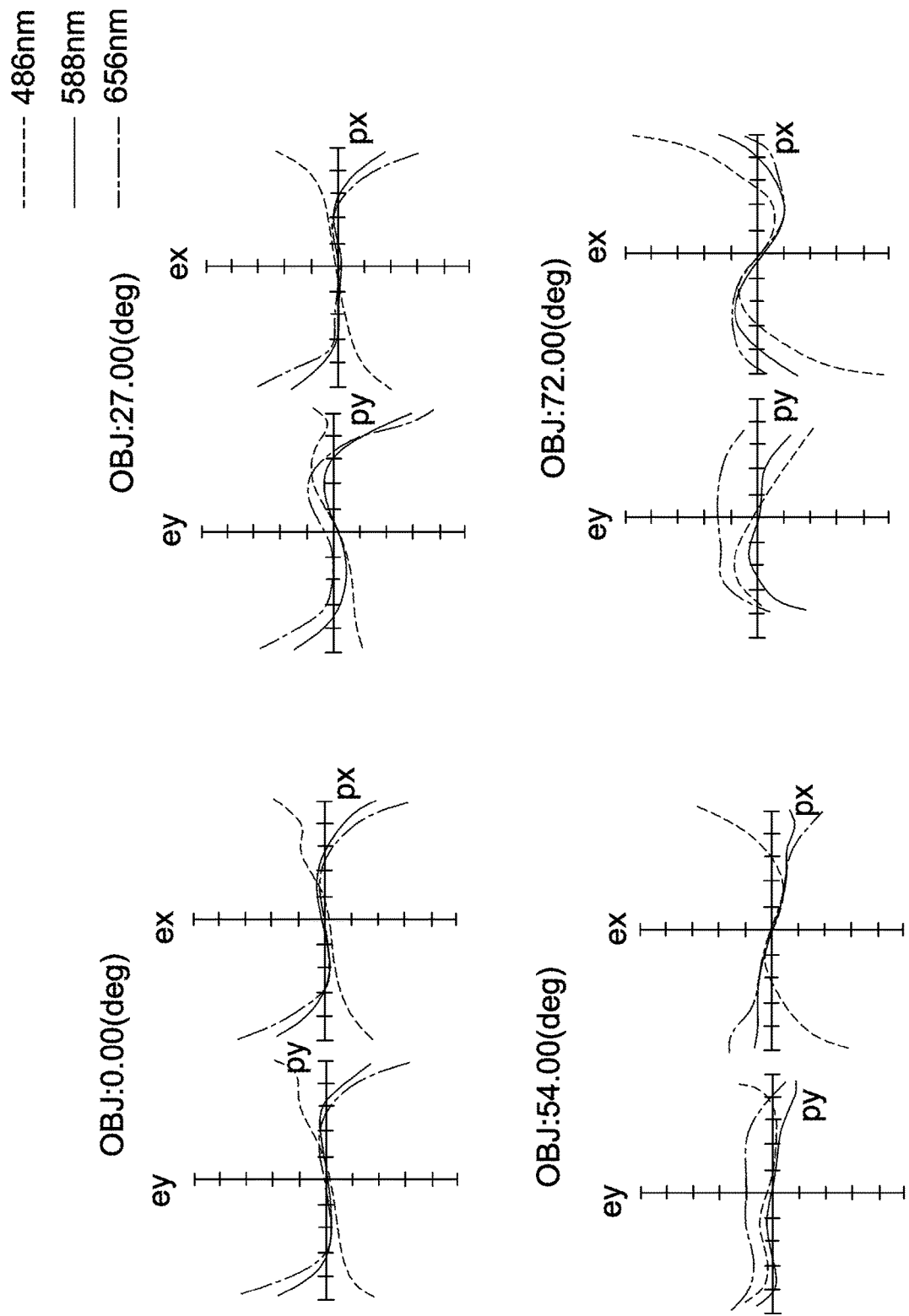
FIG. 2 shows a ray fan plot for visible light.
Figure 3:
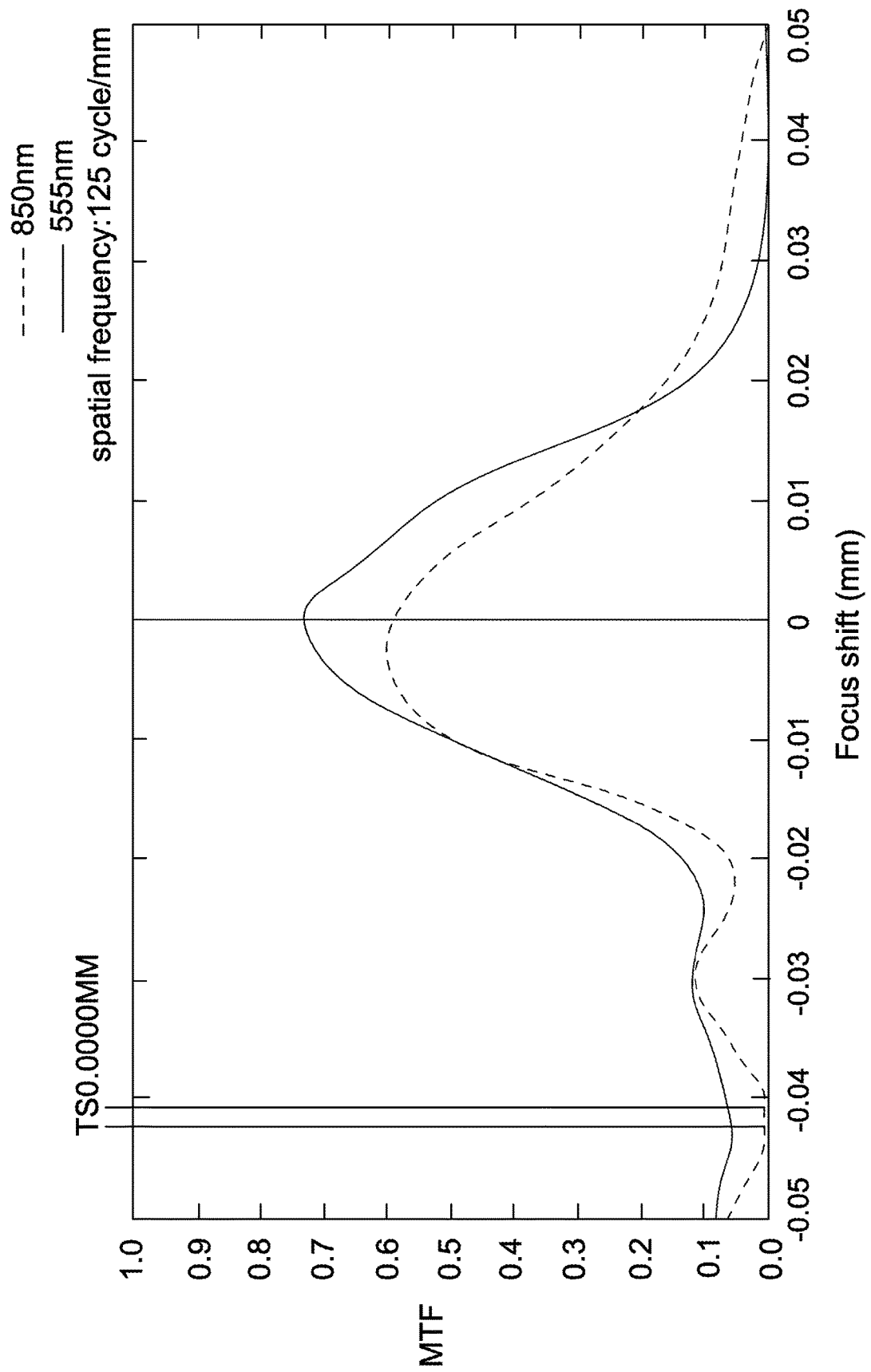
FIG. 3 depicts a MTF curve for 555 nm visible light and a MTF curve for 850 nm infrared light of the optical lens shown in FIG. 1.

FIG. 2 shows a ray fan plot for visible light of the optical lens 10a, where an abscissa of the plot represents entrance pupil positions, and an ordinate of the plot represents relative numerical values of positions on an image plane (such as the image plane S20) where main light beams are projected. FIG. 3 depicts a MTF curve for 555 nm visible light and a MTF curve for 850 nm infrared light. Note the MTF curve for visible light may be depicted according to other wavelength of light. The 555 nm visible light may pass an optical lens to form a first focal plane, the first focal plane may cross an optical axis of the optical lens to form a first intersection, the 850 nm infrared light may pass the optical lens to form a second focal plane, and the second focal plane may cross the optical axis of the optical lens to form a second intersection. A displacement between the first intersection and the second intersection may refer to as a focus shift. It can be clearly seen from FIG. 3 that the focus shift is smaller than 10 µm. The simulated results shown in FIGS. 2 and 3 are within permitted ranges specified by the standard, which indicates the above embodiment of the optical lens 10a may achieve good imaging quality and 24-hours confocal image-capturing capability.

In one embodiment, the optical lens may include two lens groups, and the front lens group may include three lenses (such as the first lens L1, second lens L2 and third lens L3) with negative refractive powers to increase light collection efficiency and achieve a full field of view (FOV) of greater than 180 degrees. The rear lens group may have at least one an aspheric lens to correct monochromatic and chromatic aberrations and may have, for example, at most three aspheric lenses. Besides, the rear lens group may include a doublet lens or a triplet lens to reduce aberrations, and thus a minimum distance between two lenses of the rear lens group along an optical axis is smaller than 0.05 mm. In one embodiment, a total number of lenses with refractive power in the optical lens is at most nine, a total track length of the optical lens is smaller than 30 mm, an F-number of the optical lens is larger than 1.6, and at least one lens of the optical lens has an Abbe number of larger than 70. The second lens group 30 may include a glass lens with Abbe numbers of greater than 60 and two plastic lenses to offer competent 24-hours confocal image-capturing capability. In other embodiment, the glass lens of the second lens group 30 may have an Abbe number of greater than 70 to further enhance the confocal image-capturing capability. In that case, the optical lens is finely corrected for chromatic aberrations over a wavelength region of 435 to 850 nm and may achieve high optical performance. Besides, a focal point for infrared light (850 nm) may substantially coincide with a focal point for visible light (555 nm); that is, a displacement between the two focal points is less than 10 m.

In one embodiment, the optical lens may satisfy a condition of 2.1<D1/D3<3.0, a further condition of 2.3<D1/D3<3.0, and a still further condition of 2.3<D1/D3<2.9, where D1 is a diameter of a surface of the first lens L1 facing the magnified side OS (the first side), and D3 is a diameter of a surface of the third lens L3 facing the magnified side OS. Meeting the above conditions may facilitate light converging capability of lenses to thus allow for better optical performance in a limited space.

In one embodiment, the optical lens may satisfy a condition of 1.9<D1/DL<3.2, a further condition of 1.9<D1/DL<3.0, and a still further condition of 2.0<D1/DL<2.9, where D1 is a diameter of a surface of the first lens (the lens nearest the magnified side) facing the magnified side OS (the first side), DL is a diameter of a surface of the last lens (the lens nearest the minified side) facing the minified side IS (the second side). Meeting the above conditions may facilitate light converging capability of lenses to reduce the scope of image beams passing through lenses to match the size of a photosensor and thus allow for better optical performance in a limited space.

In one embodiment, the optical lens may satisfy a condition of 0.146<IH/TTL<0.174, a further condition of 0.15<IH/TTL<0.17, and a still further condition of 0.152<IH/TTL<0.168, where IH is a semi-diagonal image height on an image plane that equals half of an image circle (a diagonal length of an image on the image plane) and TTL is a distance along an optical axis between a surface of a first lens (the lens nearest the magnified side) facing the magnified side OS and a surface of a last lens (the lens nearest the minified side) facing the minified side IS. Note that this criterion allows for an optimized proportion of a photosensor to a total track length; that is, providing a proportionally longer TTL when using a larger photosensor and a proportionally shorter TTL when using a smaller photosensor.

In one embodiment, the optical lens may satisfy a condition of 0.023<IH/FOV<0.026, a further condition of 0.0232<IH/FOV<0.0258, and a still further condition of 0.0235<IH/FOV<0.0255, where IH is a semi-diagonal image height on an image plane that equals half of an image circle, and FOV is a full field of view. Note that this criterion allows for improved light collection efficiency of a photosensor that collets light from the optical lens.

Figure 4:
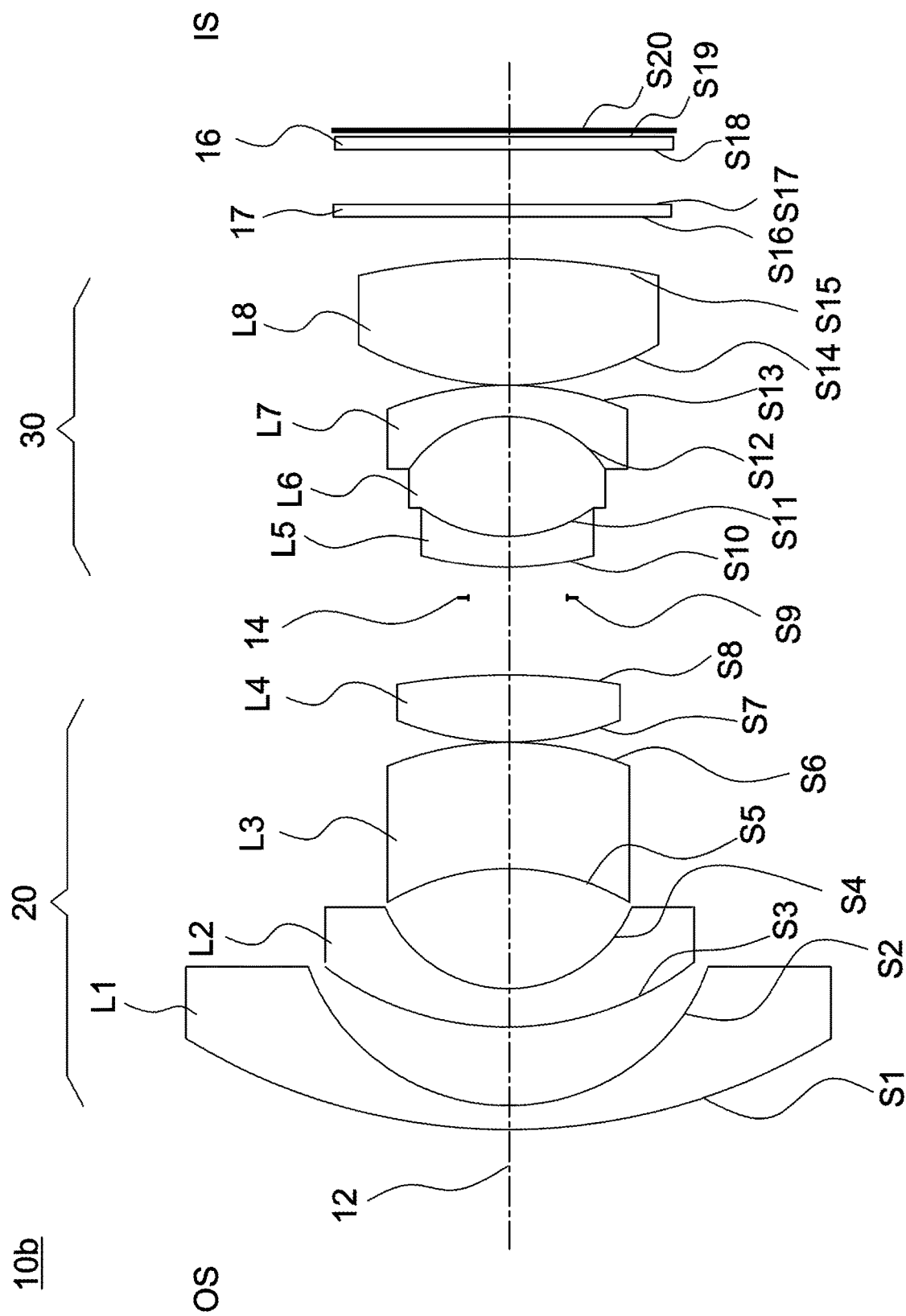
FIG. 4 shows a cross-sectional illustration of an optical lens according to another embodiment of the invention.

FIG. 4 shows a cross-sectional illustration of an optical lens according to a second embodiment of the invention. In this embodiment, the refractive powers of the first lens L1 to the eighth lens L8 are negative, negative, negative, positive, negative, positive, negative and positive, and the third lens L3 and the eighth lens L8 are aspheric lenses. The fifth lens L5, the sixth lens L6 and the seventh lens L7 are fit together to form a triplet lens. Further, the diameter of the surface S1 is 17.4 mm, the diameter of the surface S5 is 6.8 mm, and the diameter of the surface S15 is 8.6 mm. Detailed optical data and design parameters of the optical lens 10b are shown in Table 3 below.

TABLE 3

F/# = 1.89; TTL = 27.8 (mm)
IH/FOV = 0.0244; IH/TTL = 0.1583

| surface | radius of curvature (mm) | interval (mm) | refractive index | Abbe number | object description |
|---|---|---|---|---|---|
| S1 | 15.8 | 0.8 | 1.7 | 44.8 | L1 |
| S2 | 5.8 | 2.2 | | | |
| S3 | 8.8 | 0.8 | 1.9 | 40.8 | L2 |
| S4 | 3.8 | 3.3 | | | |
| S5* | −5.9 | 3.4 | 1.8 | 40.5 | L3 |
| S6* | −9.6 | 0.1 | | | |
| S7 | 9.5 | 1.7 | 2.0 | 32.3 | L4 |
| S8 | −36.8 | 2.1 | | | |
| S9 | INF | 1.1 | | | aperture stop |
| S10 | 30.5 | 0.7 | 1.7 | 28.3 | L5 |
| S11 | 4.7 | 3.2 | 1.6 | 68.6 | L6 |
| S12 | −3.3 | 0.7 | 1.8 | 27.5 | L7 |
| S13 | −8.3 | 0.2 | | | |
| S14* | 8.0 | 3.2 | 1.5 | 81.5 | L8 |
| S15* | −24.5 | 0.9 | | | |
| S16 | INF | 0.2 | | | |
| S17 | INF | 2.9 | | | IR filter |
| S18 | INF | 0.4 | 1.5 | 64.1 | cover glass |
| S19 | INF | 0.05 | | | |
| S20 | | | | | image plane |

Table 4 lists aspheric coefficients and conic constant of each aspheric surface of the optical lens according to the second embodiment of the invention.

TABLE 4

| | S5 | S6 | S14 | S15 |
|---|---|---|---|---|
| k | 0.0E+00 | 0.0E+00 | −7.0E−01 | −1.3E+01 |
| $\alpha_4$ | 6.4E−04 | 3.6E−04 | −2.9E−04 | −3.5E−04 |
| $\alpha_6$ | 2.4E−05 | 1.0E−05 | 1.0E−05 | −1.2E−05 |
| $\alpha_8$ | −2.0E−09 | −2.7E−07 | 1.1E−07 | 4.4E−06 |
| $\alpha_{10}$ | −7.8E−09 | 0.0E+00 | 5.5E−08 | −2.8E−07 |
| $\alpha_{12}$ | 0.0E+00 | 0.0E+00 | −4.4E−10 | 1.0E−08 |

Figure 7:
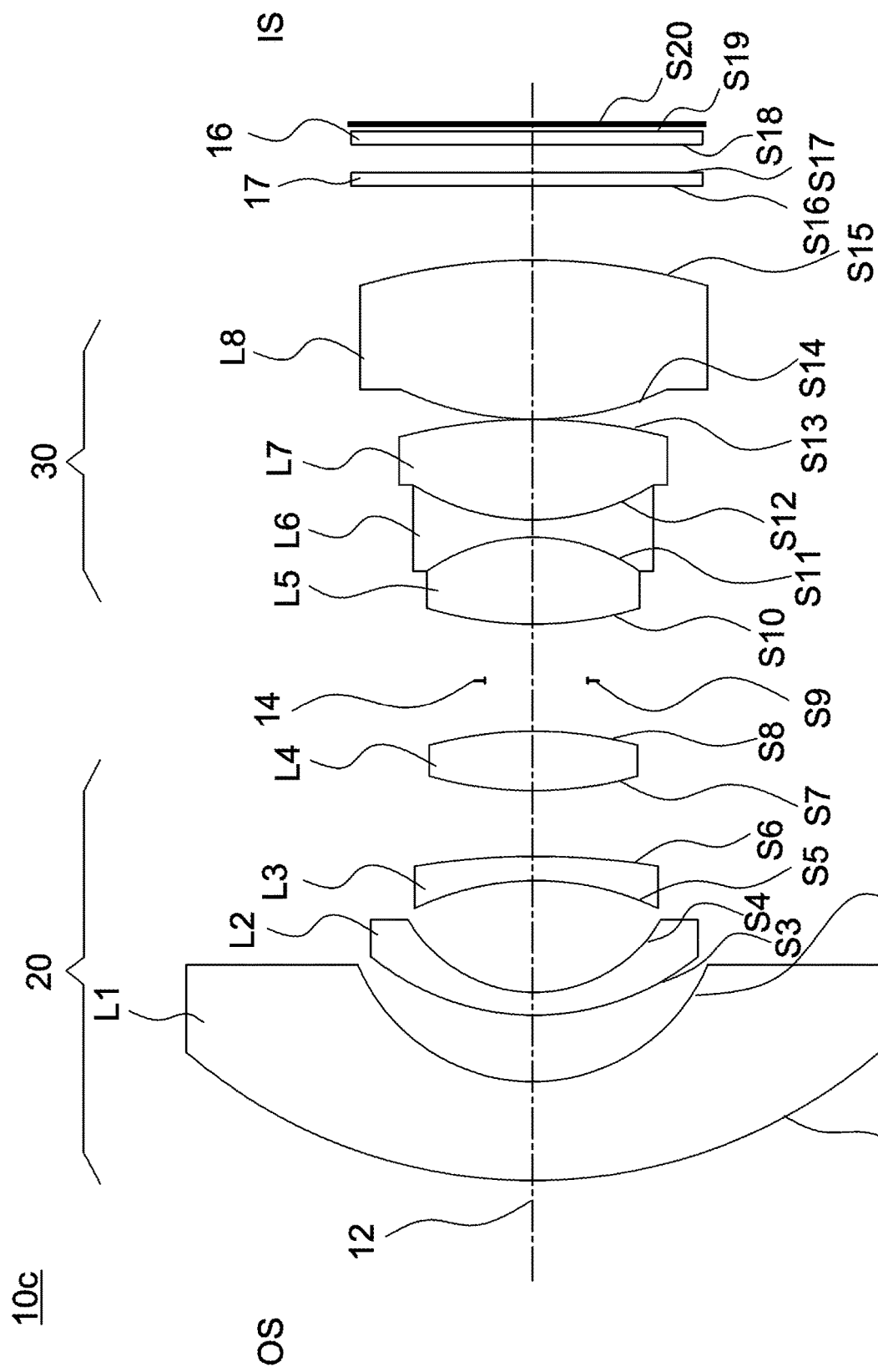
FIG. 7 shows a cross-sectional illustration of an optical lens according to another embodiment of the invention.

FIG. 7 shows a cross-sectional illustration of an optical lens according to a third embodiment of the invention. In this embodiment, the refractive powers of the first lens L1 to the eighth lens L8 are negative, negative, negative, positive, positive, negative, positive and positive, and the eighth lens L8 is an aspheric lens. The fifth lens L5, the sixth lens L6 and the seventh lens L7 are fit together to form a triplet lens. Further, the diameter of the surface S1 is 18.2 mm, the diameter of the surface S5 is 6.6 mm, and the diameter of the surface S15 is 9.2 mm. Detailed optical data and design parameters of the optical lens 10c are shown in Table 5 below.

TABLE 5

F/# = 1.89; TTL = 27.5 (mm)
IH/FOV = 0.0255; IH/TTL = 0.1646

| surface | radius of curvature (mm) | interval (mm) | refractive index | Abbe number | object description |
|---|---|---|---|---|---|
| S1 | 14.0 | 2.5 | 2.1 | 17.0 | L1 |
| S2 | 4.9 | 1.7 | | | |
| S3 | 6.8 | 0.5 | 2.0 | 29.1 | L2 |
| S4 | 3.8 | 2.8 | | | |
| S5 | −8.1 | 0.5 | 1.4 | 95.1 | L3 |
| S6 | −77.3 | 2.0 | | | |
| S7 | 12.5 | 1.4 | 2.1 | 17.0 | L4 |
| S8 | −21.0 | 1.2 | | | |
| S9 | INF | 1.7 | | | aperture stop |
| S10 | 9.6 | 2.3 | 1.7 | 54.7 | L5 |
| S11 | −4.4 | 0.5 | 1.9 | 20.4 | L6 |
| S12 | 6.0 | 2.6 | 1.7 | 55.5 | L7 |
| S13 | −10.7 | 0.1 | | | |
| S14* | 7.6 | 3.9 | 1.5 | 8.2 | L8 |
| S15* | 693.0 | 2.4 | | | |
| S16 | INF | 0.3 | 1.5 | 64.1 | IR filter |
| S17 | INF | 0.3 | | | |
| S18 | INF | 0.5 | 1.5 | 64.1 | cover glass |
| S19 | INF | 0.3 | | | |
| S20 | | | | | image plane |

Table 6 lists aspheric coefficients and conic constant of each aspheric surface of the optical lens according to the third embodiment of the invention.

TABLE 6

| | S14 | S15 |
|---|---|---|
| k | 0.0E+00 | 0.0E+00 |
| $\alpha_4$ | −1.4E−03 | −8.6E−04 |
| $\alpha_6$ | −1.7E−05 | −5.1E−05 |
| $\alpha_8$ | −1.2E−06 | −7.0E−08 |
| $\alpha_{10}$ | −5.5E−08 | 1.1E−08 |

Figure 10:
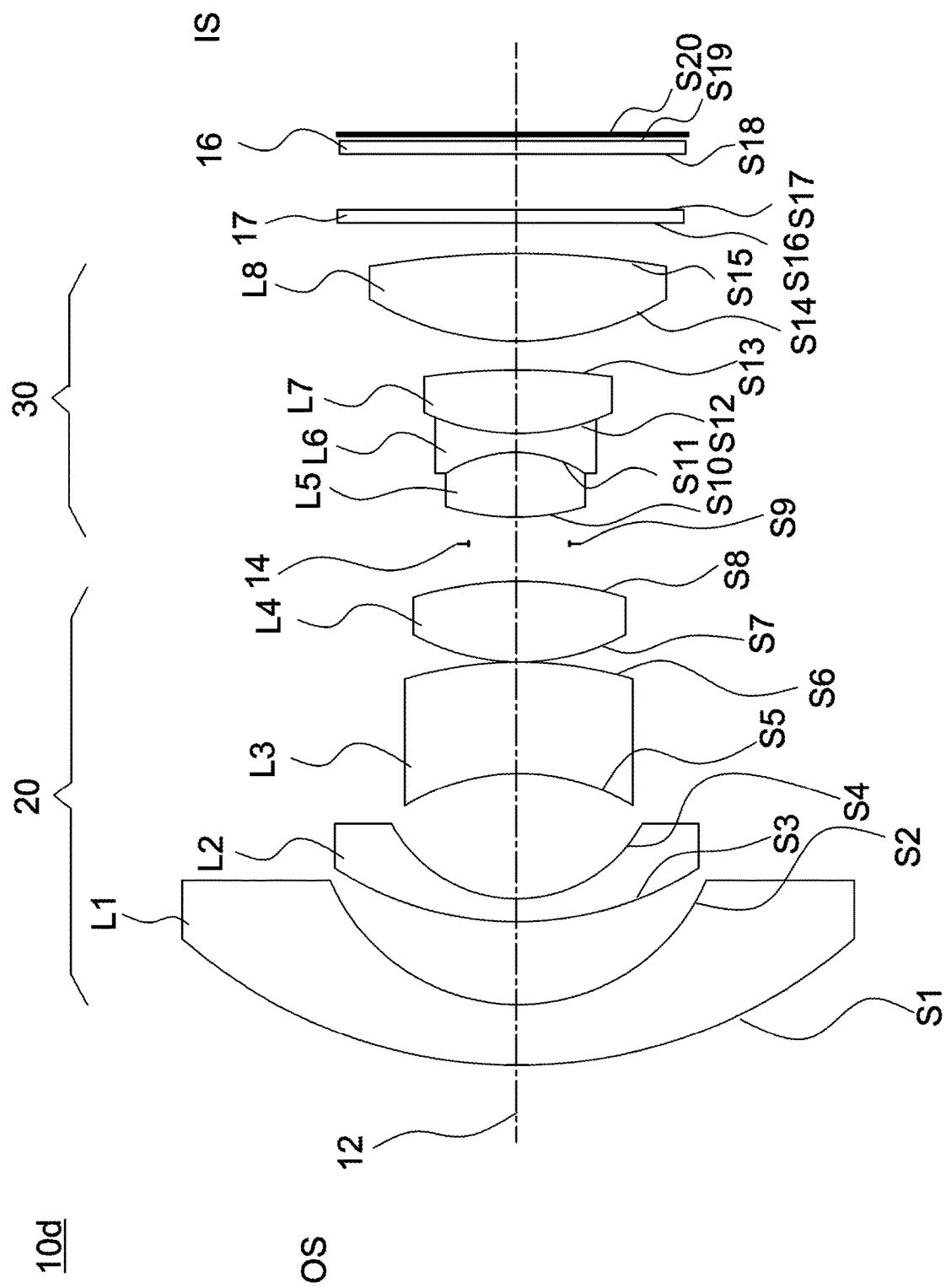
FIG. 10 shows a cross-sectional illustration of an optical lens according to another embodiment of the invention.

FIG. 10 shows a cross-sectional illustration of an optical lens according to a fourth embodiment of the invention. In this embodiment, the refractive powers of the first lens L1 to the eighth lens L8 are negative, negative, negative, positive, positive, negative, positive and positive, and the third lens L3 and the seventh lens L7 are aspheric lenses. The fifth lens L5, the sixth lens L6 and the seventh lens L7 are fit together to form a triplet lens. Further, the diameter of the surface S1 is 20.8 mm, the diameter of the surface S5 is 7.4 mm, and the diameter of the surface S15 is 9.4 mm. Detailed optical data and design parameters of the optical lens 10d are shown in Table 7 below.

TABLE 7

F/# = 1.68; TTL = 28.5 (mm)
IH/FOV = 0.02433; IH/TTL = 0.1579

| surface | radius of curvature (mm) | interval (mm) | refractive index | Abbe number | object description |
|---|---|---|---|---|---|
| S1 | 16.3 | 1.7 | 1.7 | 53.9 | L1 |
| S2 | 6.3 | 2.6 | | | |

TABLE 7-continued

F/# = 1.68; TTL = 28.5 (mm)
IH/FOV = 0.02433; IH/TTL = 0.1579

| surface | radius of curvature (mm) | interval (mm) | refractive index | Abbe number | object description |
|---|---|---|---|---|---|
| S3 | 12.4 | 0.6 | 1.9 | 18.9 | L2 |
| S4 | 4.6 | 3.8 | | | |
| S5* | −5.4 | 3.3 | 1.8 | 40.5 | L3 |
| S6* | −10.5 | 0.1 | | | |
| S7 | 7.0 | 1.9 | 1.9 | 18.0 | L4 |
| S8 | −67.6 | 1.7 | | | |
| S9 | INF | 0.9 | | | aperture stop |
| S10 | 16.2 | 1.8 | 1.8 | 46.6 | L5 |
| S11 | −3.3 | 0.6 | 1.9 | 18.0 | L6 |
| S12 | 5.7 | 1.8 | 1.7 | 49.3 | L7 |
| S13* | −17.9 | 1.2 | | | |
| S14 | 10.6 | 2.2 | 1.9 | 18.0 | L8 |
| S15 | −91.4 | 1.0 | | | |
| S16 | INF | 0.2 | 1.5 | 64.1 | IR filter |
| S17 | INF | 2.5 | | | |
| S18 | INF | 0.4 | 1.5 | 64.1 | cover glass |
| S19 | INF | 0.05 | | | |
| S20 | | | | | image plane |

Table 8 lists aspheric coefficients and conic constant of each aspheric surface of the optical lens according to the fourth embodiment of the invention.

TABLE 8

| | S5 | S6 | S13 |
|---|---|---|---|
| k | 0.0E+00 | 0.0E+00 | 0.0E+00 |
| $\alpha_4$ | 1.2E−03 | 7.5E−04 | 7.8E−04 |
| $\alpha_6$ | 4.1E−05 | 2.3E−05 | 1.4E−12 |
| $\alpha_8$ | 2.1E−16 | 3.6E−11 | −1.6E−18 |
| $\alpha_{10}$ | −1.0E−20 | 7.1E−18 | −4.4E−24 |

Figure 13:
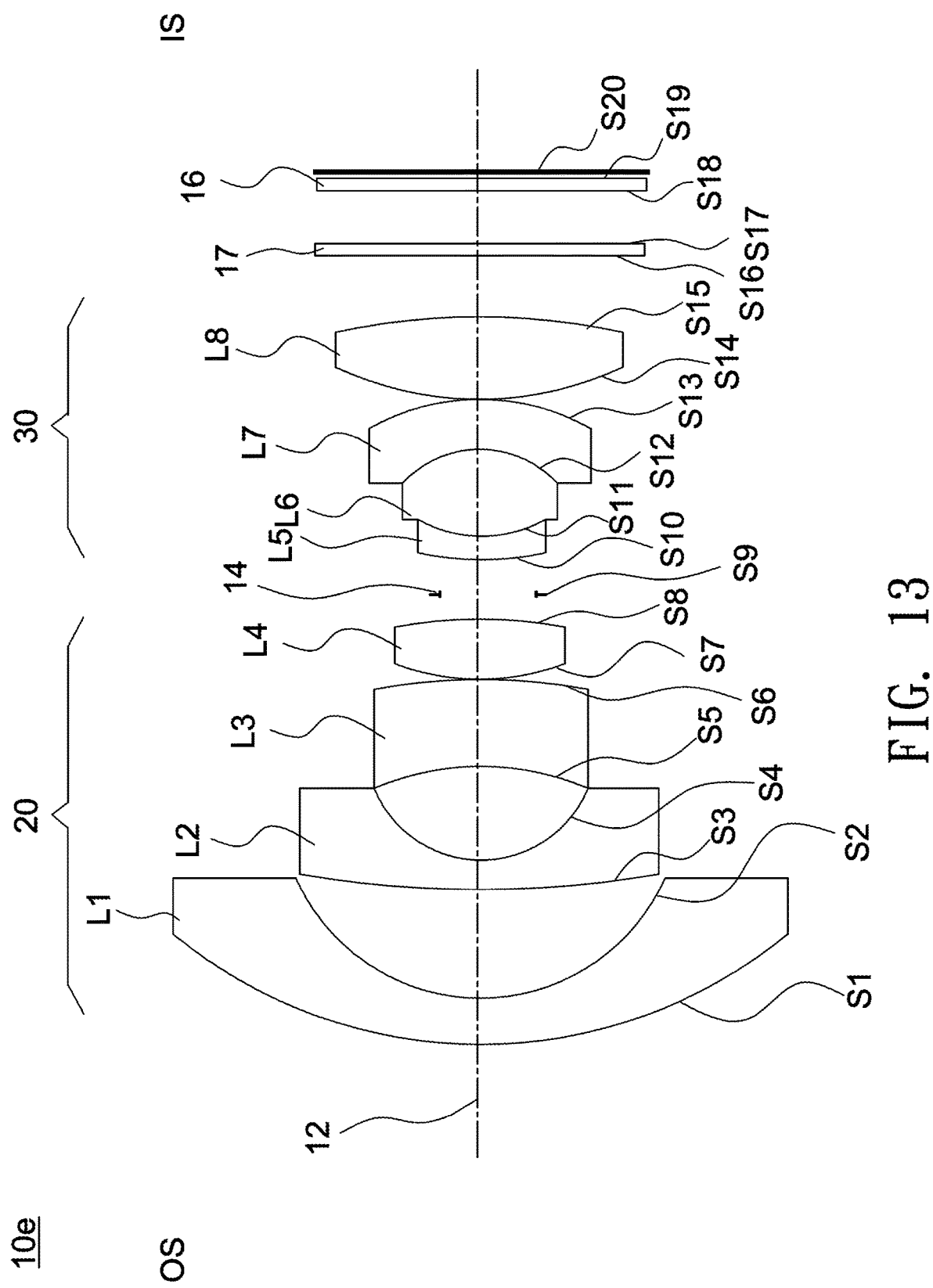
FIG. 13 shows a cross-sectional illustration of an optical lens according to another embodiment of the invention.

FIG. 13 shows a cross-sectional illustration of an optical lens according to a fifth embodiment of the invention. In this embodiment, the refractive powers of the first lens L1 to the eighth lens L8 are negative, negative, negative, positive, negative, positive, negative and positive, and the first lens L1 to the eighth lens L8 are all spherical lenses. The fifth lens L5, the sixth lens L6 and the seventh lens L7 are fit together to form a triplet lens. Further, the diameter of the surface S1 is 18.8 mm, the diameter of the surface S5 is 6.8 mm, and the diameter of the surface S15 is 8.8 mm. Detailed optical data and design parameters of the optical lens 10e are shown in Table 9 below.

TABLE 9

F/# = 1.88; TTL = 27.8 (mm)
IH/FOV = 0.02437; IH/TTL = 0.1596

| surface | radius of curvature (mm) | interval (mm) | refractive index | Abbe number | object description |
|---|---|---|---|---|---|
| S1 | 14.7 | 1.4 | 1.9 | 40.8 | L1 |
| S2 | 6.1 | 3.6 | | | |
| S3 | 75.7 | 0.6 | 1.4 | 94.9 | L2 |
| S4 | 3.5 | 2.8 | | | |
| S5 | −10.1 | 2.5 | 1.5 | 70.2 | L3 |
| S6 | −17.3 | 0.1 | | | |
| S7 | 7.8 | 1.5 | 1.9 | 24.0 | L4 |
| S8 | −59.9 | 1.0 | | | |
| S9 | INF | 1.2 | | | aperture stop |
| S10 | 40.6 | 0.6 | 1.8 | 22.8 | L5 |
| S11 | 4.6 | 2.5 | 1.6 | 68.6 | L6 |

TABLE 9-continued

F/# = 1.88; TTL = 27.8 (mm)
IH/FOV = 0.02437; IH/TTL = 0.1596

| surface | radius of curvature (mm) | interval (mm) | refractive index | Abbe number | object description |
|---|---|---|---|---|---|
| S12 | −3.0 | 1.5 | 1.9 | 24.0 | L7 |
| S13 | −6.2 | 0.1 | | | |
| S14 | 11.4 | 2.0 | 1.9 | 40.8 | L8 |
| S15 | −91.9 | 3.2 | | | |
| S16 | INF | 0.2 | 1.5 | 64.1 | IR filter |
| S17 | INF | 2.5 | | | |
| S18 | INF | 0.4 | 1.5 | 64.1 | cover glass |
| S19 | INF | 0.05 | | | |
| S20 | | | | | image plane |

Figure 16:
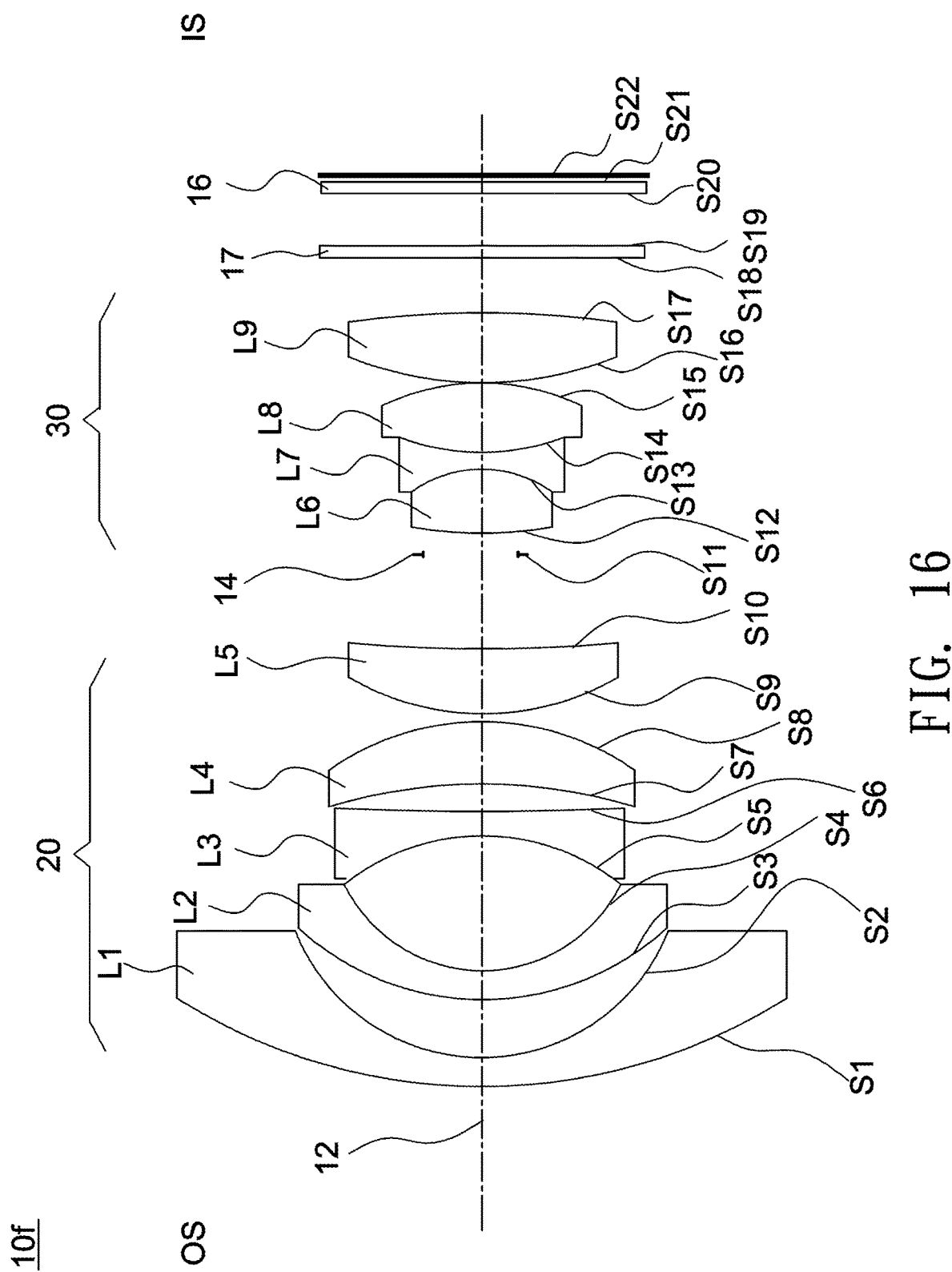
FIG. 16 shows a cross-sectional illustration of an optical lens according to another embodiment of the invention.

FIG. 16 shows a cross-sectional illustration of an optical lens according to a sixth embodiment of the invention. In this embodiment, the refractive powers of the first lens L1 to the ninth lens L9 are negative, negative, negative, positive, positive, positive, negative, positive and positive, and the first lens L1 to the ninth lens L9 are all spherical lenses. The sixth lens L6, the seventh lens L7 and the eighth lens L8 are fit together to form a triplet lens. Further, the diameter of the surface S1 is 18.0 mm, the diameter of the surface S5 is 8.2 mm, and the diameter of the surface S17 is 8.0 mm. Detailed optical data and design parameters of the optical lens 10f are shown in Table 10 below.

TABLE 10

F/# = 1.86; TTL = 27.8 (mm)
IH/FOV = 0.0242; IH/TTL = 0.1611

| surface | radius of curvature (mm) | interval (mm) | refractive index | Abbe number | object description |
|---|---|---|---|---|---|
| S1 | 17.0 | 0.9 | 1.9 | 37.4 | L1 |
| S2 | 5.9 | 1.7 | | | |
| S3 | 7.8 | 0.8 | 2.0 | 19.3 | L2 |
| S4 | 4.4 | 4.0 | | | |
| S5 | −6.3 | 0.6 | 1.9 | 24.8 | L3 |
| S6 | 289.3 | 0.6 | | | |
| S7 | −19.6 | 2.0 | 2.0 | 19.3 | L4 |
| S8 | −7.6 | 0.1 | | | |
| S9 | 7.0 | 2.1 | 1.9 | 24.0 | L5 |
| S10 | 64.8 | 2.7 | | | |
| S11 | INF | 0.6 | | | aperture stop |
| S12 | 19.5 | 1.7 | 1.6 | 68.6 | L6 |
| S13 | −3.5 | 0.5 | 2.0 | 19.3 | L7 |
| S14 | 6.9 | 2.0 | 1.7 | 54.7 | L8 |
| S15 | −7.5 | 0.1 | | | |
| S16 | 11.9 | 1.9 | 1.9 | 20.9 | L9 |
| S17 | −29.9 | 2.3 | | | |
| S18 | INF | 0.2 | 1.5 | 64.1 | IR filter |
| S19 | INF | 2.5 | | | |
| S20 | INF | 0.4 | 1.5 | 64.1 | cover glass |
| S21 | INF | 0.0 | | | |
| S22 | | | | | image plane |

Figure 5:
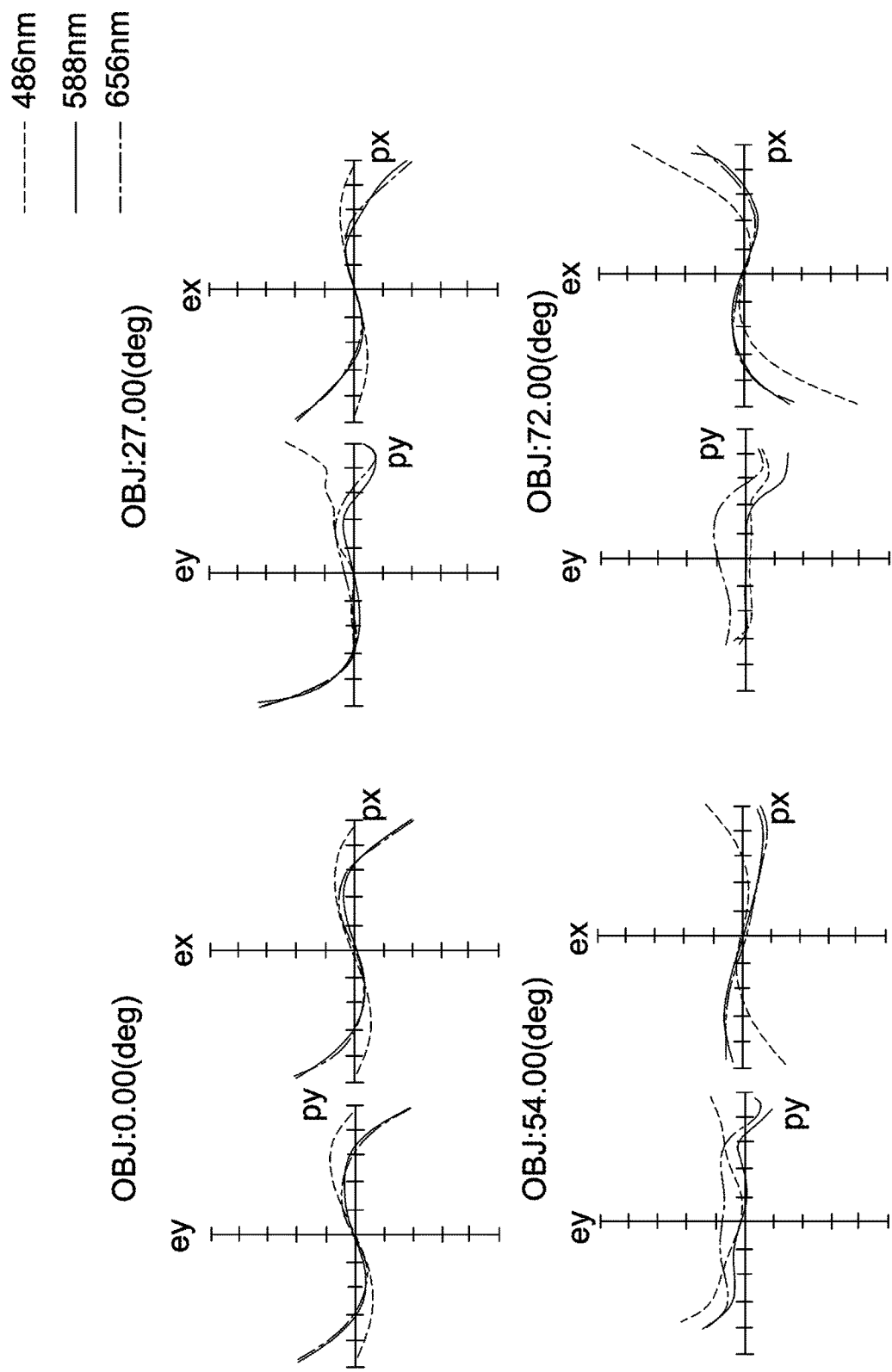
FIG. 5 shows a ray fan plot for visible light.
Figure 6:
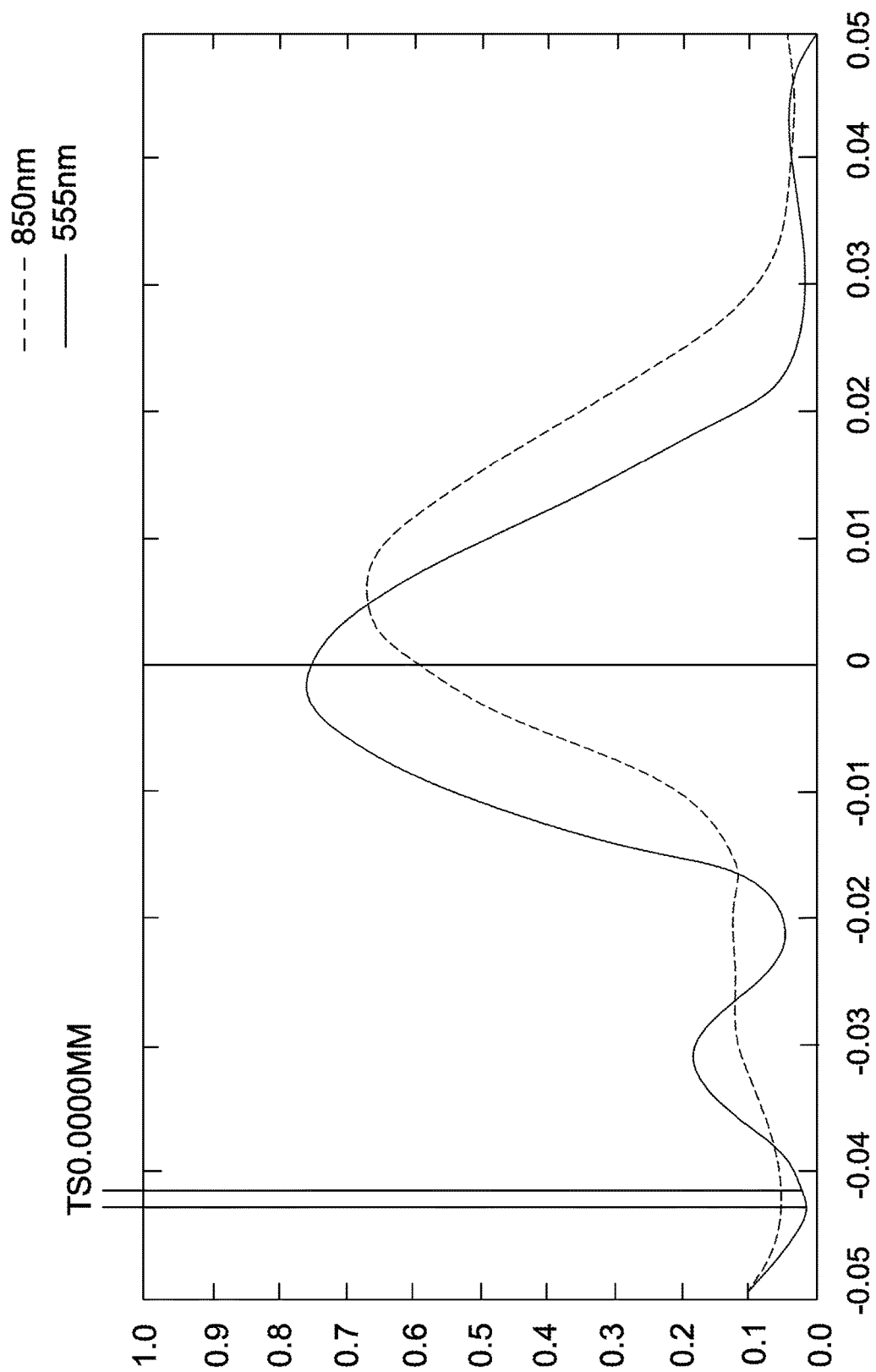
FIG. 6 depicts a MTF curve for 555 nm visible light and a MTF curve for 850 nm infrared light of the optical lens shown in FIG. 4.
Figure 8:
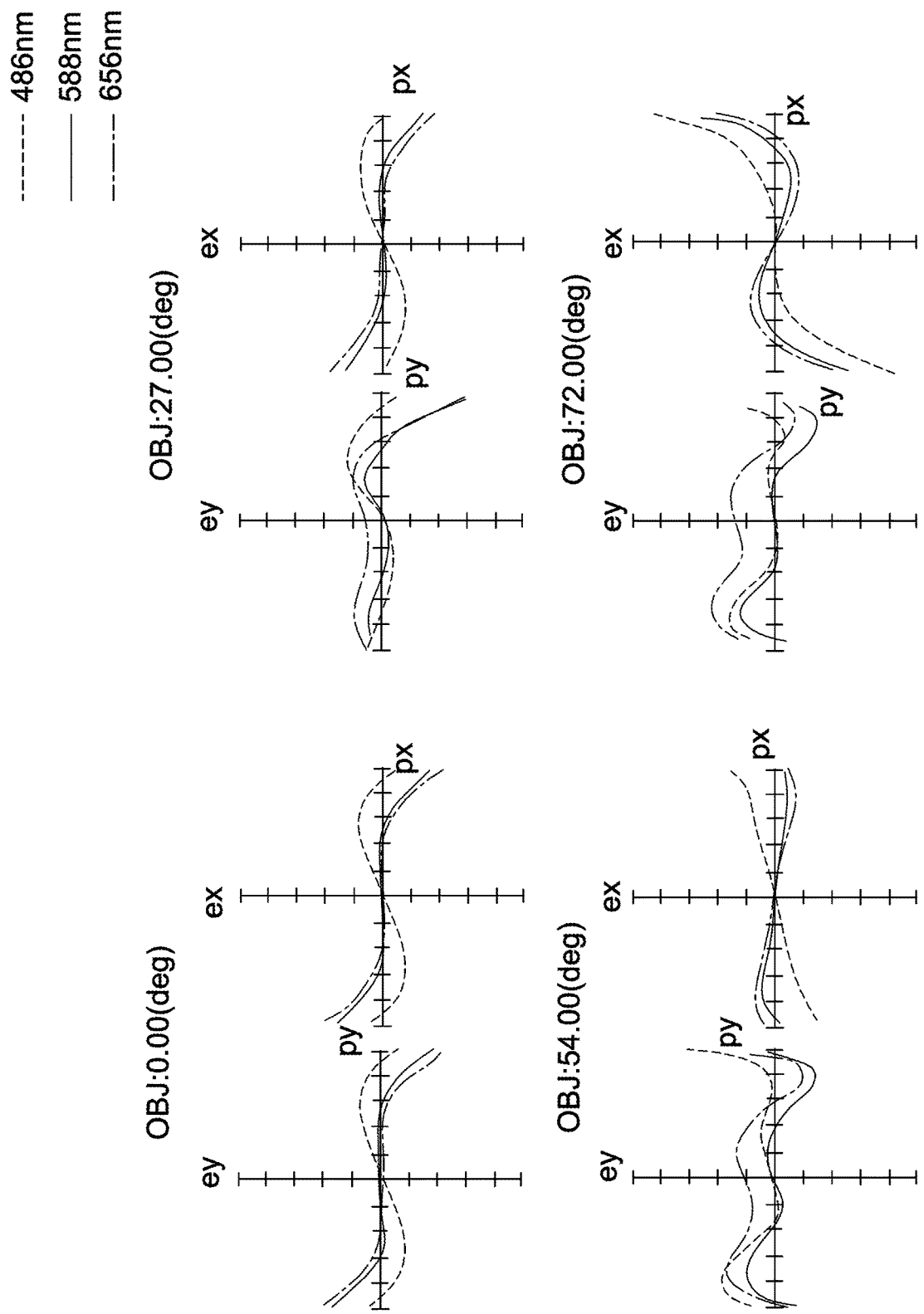
FIG. 8 shows a ray fan plot for visible light.
Figure 9:
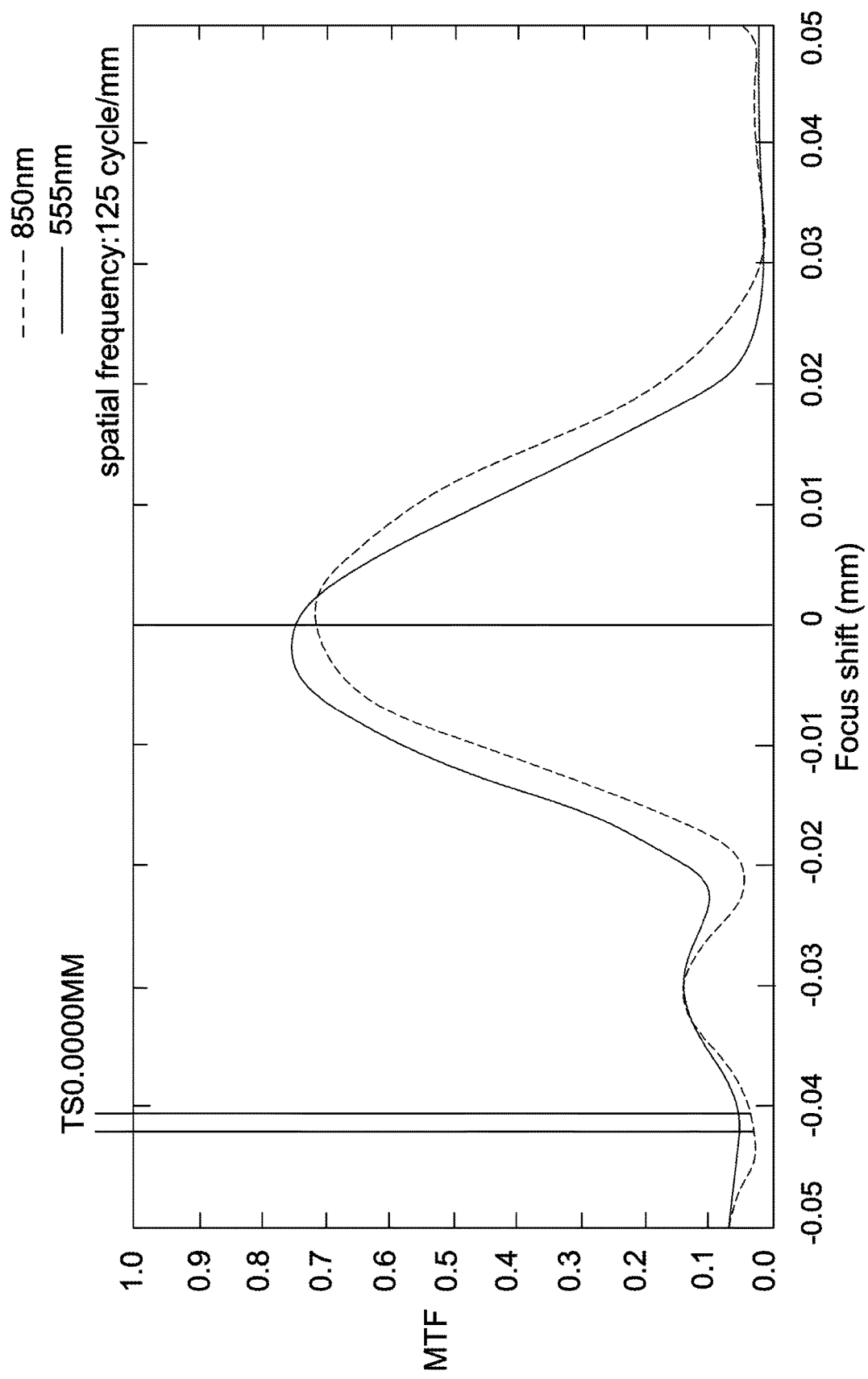
FIG. 9 depicts a MTF curve for 555 nm visible light and a MTF curve for 850 nm infrared light of the optical lens shown in FIG. 7.
Figure 11:
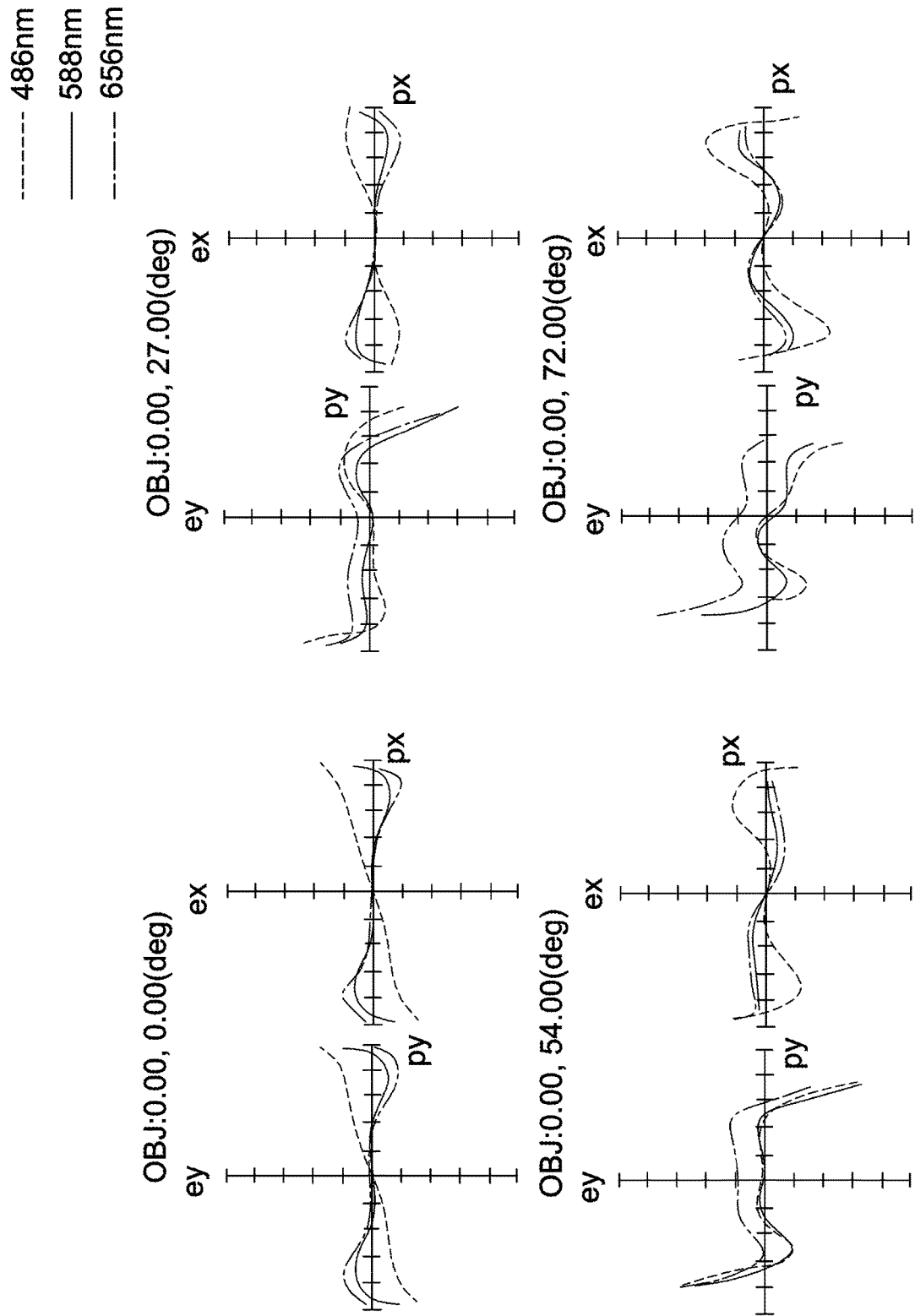
FIG. 11 shows a ray fan plot for visible light.
Figure 12:
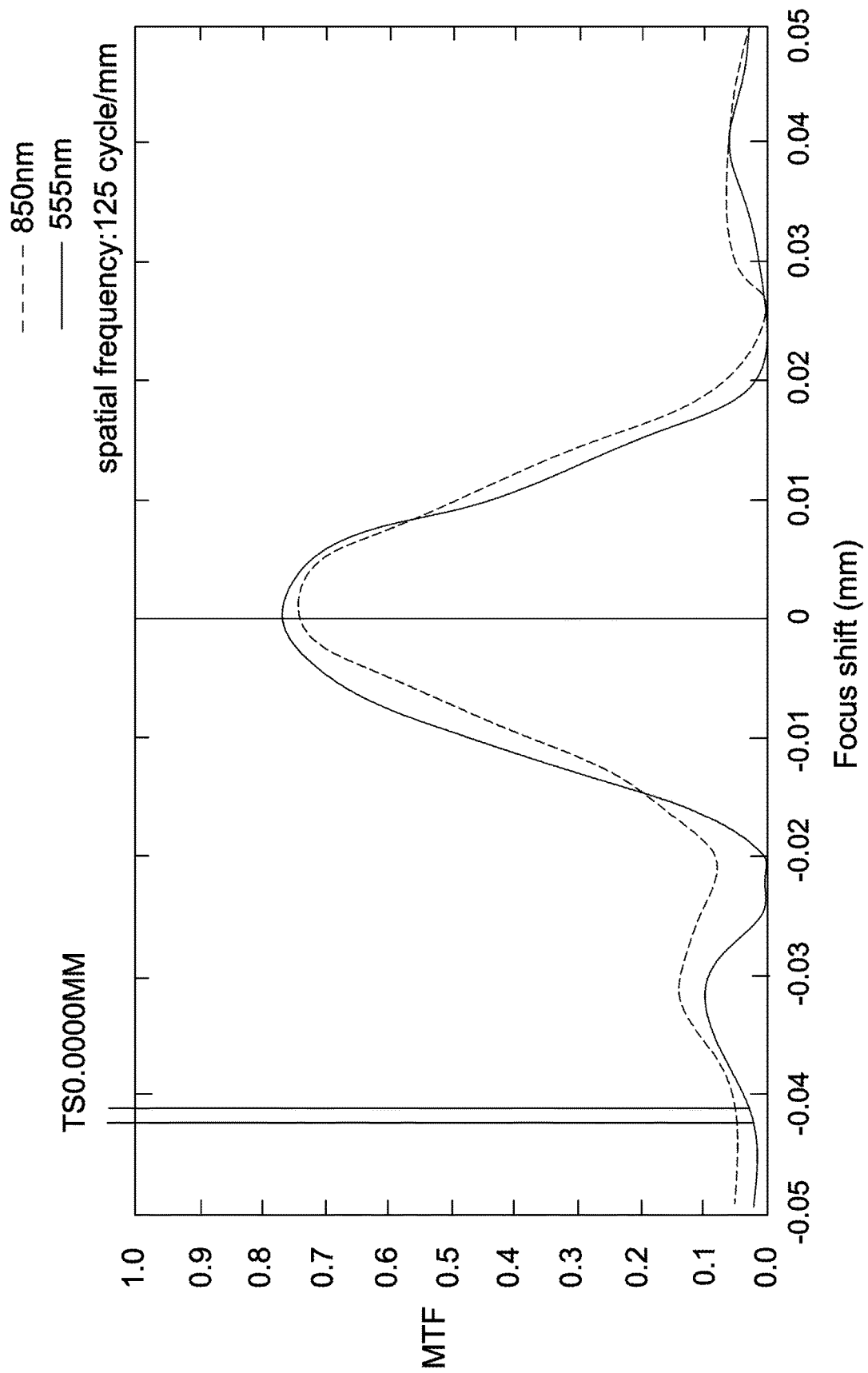
FIG. 12 depicts a MTF curve for 555 nm visible light and a MTF curve for 850 nm infrared light of the optical lens shown in FIG. 10.
Figure 14:
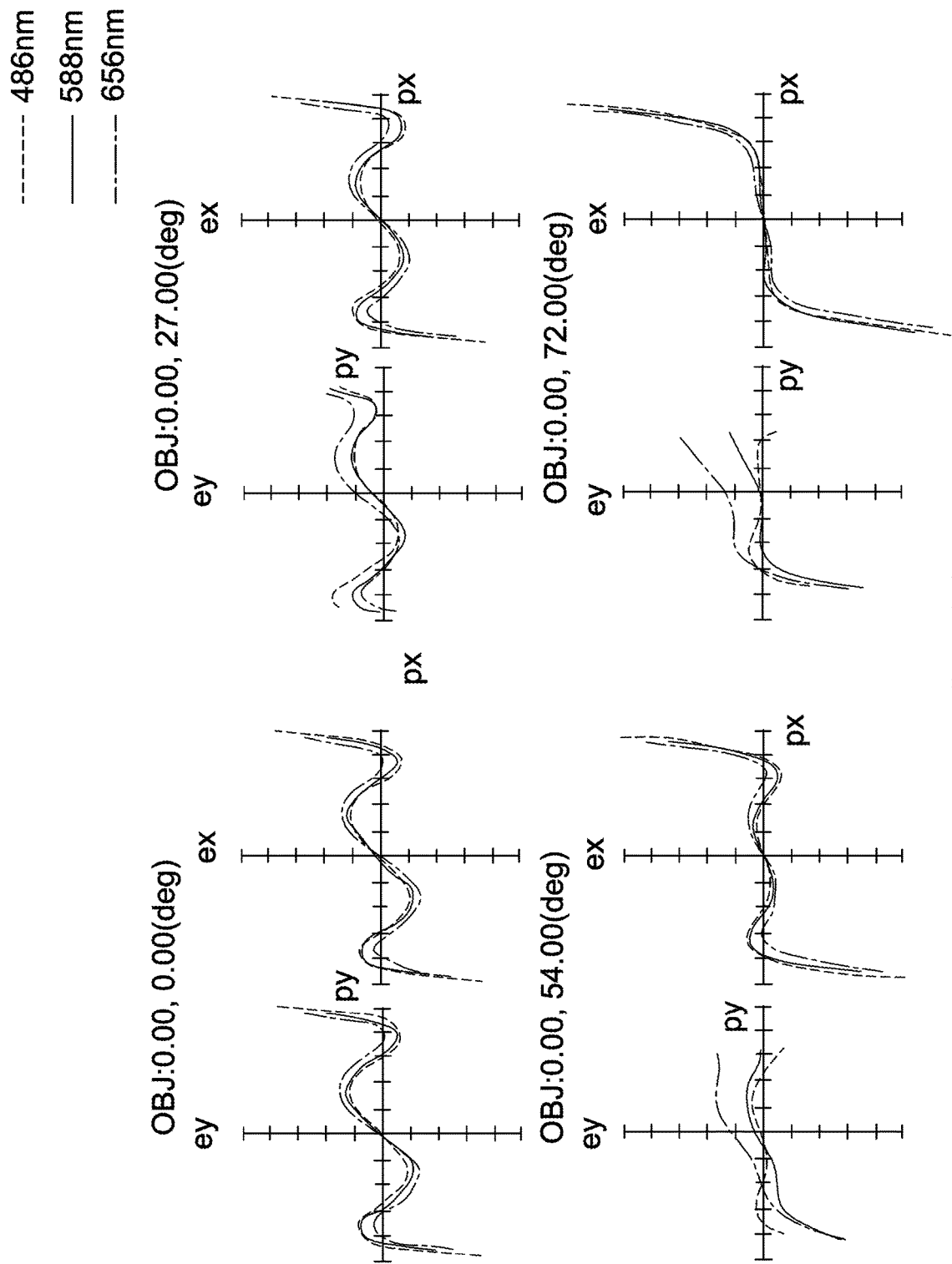
FIG. 14 shows a ray fan plot for visible light.
Figure 15:
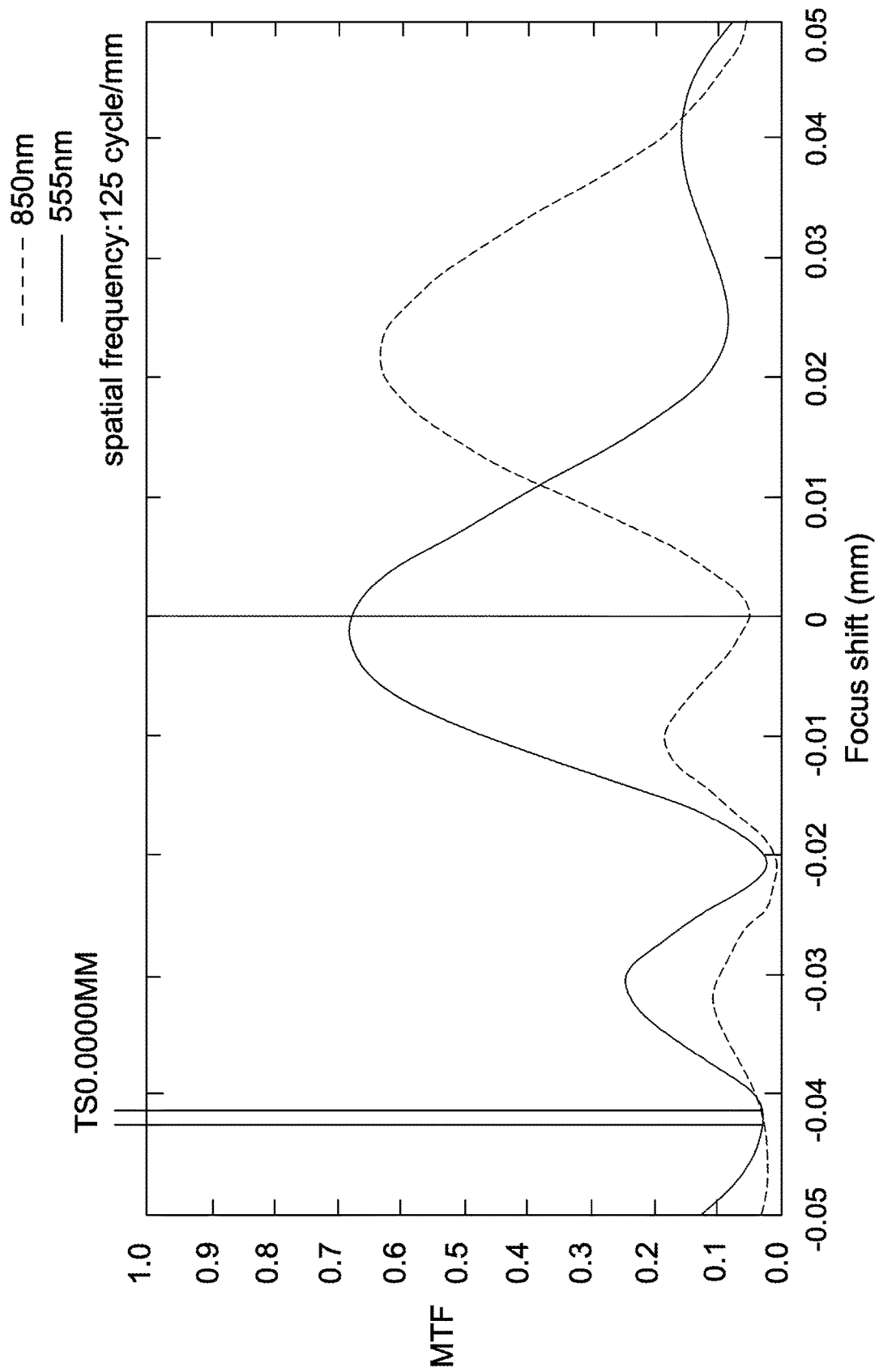
FIG. 15 depicts a MTF curve for 555 nm visible light and a MTF curve for 850 nm infrared light of the optical lens shown in FIG. 13.
Figure 17:
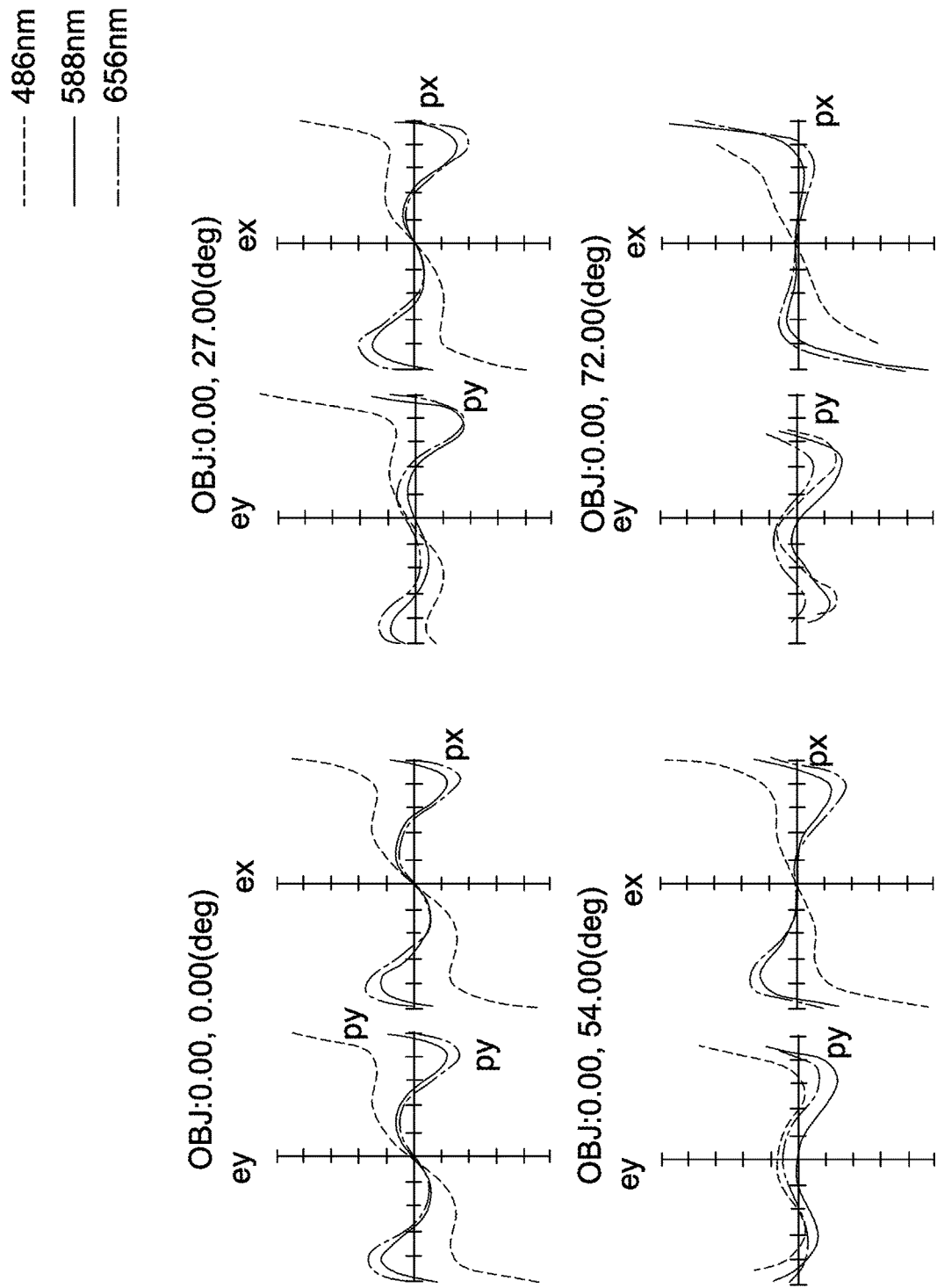
FIG. 17 shows a ray fan plot for visible light.
Figure 18:
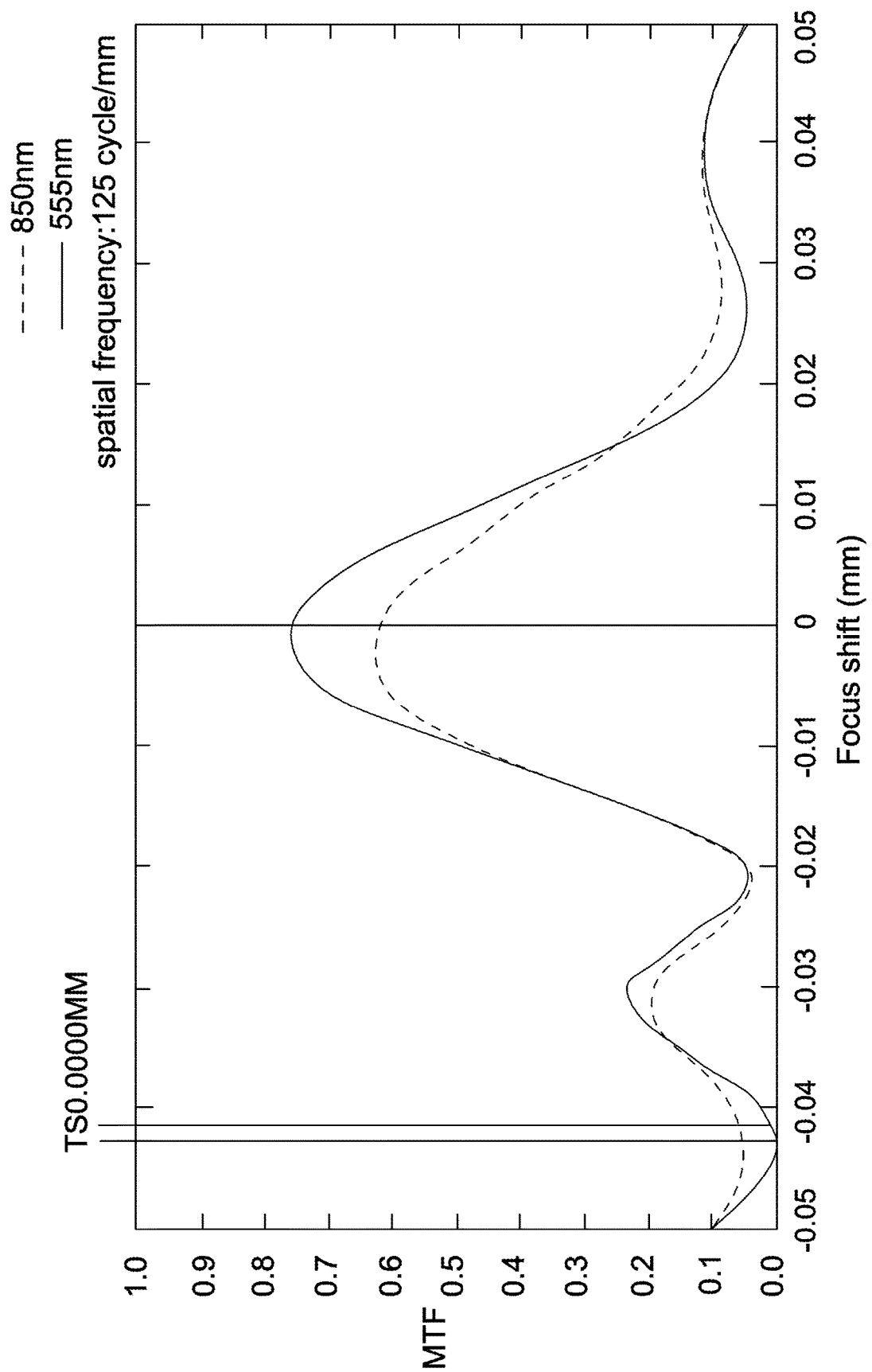
FIG. 18 depicts a MTF curve for 555 nm visible light and a MTF curve for 850 nm infrared light of the optical lens shown in FIG. 16.

FIG. 5 and FIG. 6 illustrate optical simulation results of the optical lens 10b, where FIG. 5 shows a ray fan plot for visible light of the optical lens 10b and FIG. 3 shows a MTF curve for 555 nm visible light and a MTF curve for 850 nm infrared light. FIG. 8 and FIG. 9 illustrate optical simulation results of the optical lens 10c, where FIG. 8 shows a ray fan plot for visible light of the optical lens 10c and FIG. 9 shows a MTF curve for 555 nm visible light and a MTF curve for 850 nm infrared light. FIG. 11 and FIG. 12 illustrate optical simulation results of the optical lens 10d, where FIG. 11 shows a ray fan plot for visible light of the optical lens 10d and FIG. 12 shows a MTF curve for 555 nm visible light and a MTF curve for 850 nm infrared light. FIG. 14 and FIG. 15 illustrate optical simulation results of the optical lens 10e, where FIG. 14 shows a ray fan plot for visible light of the optical lens 10d and FIG. 15 shows a MTF curve for 555 nm visible light and a MTF curve for 850 nm infrared light. FIG. 17 and FIG. 18 illustrate optical simulation results of the optical lens 10f, where FIG. 17 shows a ray fan plot for visible light of the optical lens 10f and FIG. 18 shows a MTF curve for 555 nm visible light and a MTF curve for 850 nm infrared light. The simulated results shown in the above figures are within permitted ranges specified by the standard, which indicates the optical lens according to the above embodiments may achieve good imaging quality. Besides, FIGS. 3, 6, 9, 12 and 18 each show a focus shift of smaller than 10 μm, which indicates the embodiments shown in FIGS. 3, 6, 9, 12 and 18 have good 24-hours confocal image-capturing capability.

Figure 19:
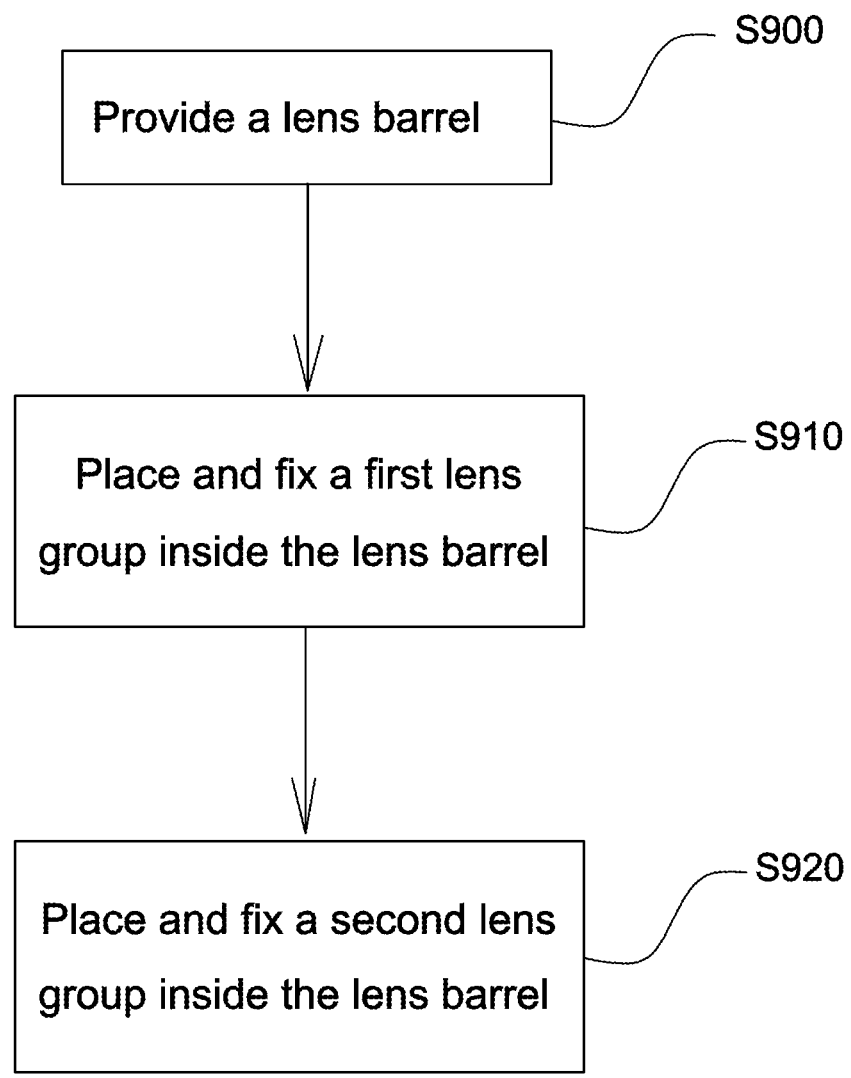
FIG. 19 shows a schematic diagram illustrating a fabrication method of an optical lens according to an embodiment of the invention.

FIG. 19 shows a schematic diagram illustrating a fabrication method of an optical lens according to an embodiment of the invention. As shown in FIG. 19, the fabrication method may be applied to the optical lenses 10a-10f shown in FIGS. 1, 4, 7, 10, 13 and 16. The following example is described with reference to the optical lens 10a of FIG. 1, but the invention is not limited thereto. In this embodiment, the fabrication method for the optical lens 10a may include the steps of providing a lens barrel (Step S900), placing and fixing a first lens group 20 inside the lens barrel (Step S910), and placing and fixing a second lens group 30 inside the lens barrel (Step S920). The order of the above steps is not restricted and may vary according to actual demands.

According to the above embodiments, the optical lens may achieve lighter weight, lower fabrication costs, good imaging quality and 24-hours confocal image-capturing capability in a limited layout space.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical lens, comprising:
   a first lens group with a negative refractive power and comprising, in order from a first side to a second side, a first lens with a negative refractive power, a second lens with a refractive power and a third lens with a negative refractive power;
   a second lens group with a positive refractive power and disposed between the first lens group and the second side; and
   an aperture stop disposed between the first lens group and the second lens group, the optical lens having at most nine lenses with refractive powers and satisfying the conditions:
   $2.1 < D1/D3 < 3.0$ and $1.9 < D1/DL < 3.2$, where D1 is a diameter of a surface of the first lens facing the first side, D3 is a diameter of a surface of the third lens facing the first side, DL is a diameter of a surface of a last lens facing the second side, and the last lens is nearest the second side as compared with any other lens of the optical lens.

2. The optical lens as claimed in claim 1, wherein a total track length of the optical lens is smaller than 30 mm.

3. The optical lens as claimed in claim 1, wherein a full field of view of the optical lens is greater than 180 degrees.

4. The optical lens as claimed in claim 1, wherein the optical lens satisfies one of the following conditions:
   (1) the second lens has a negative refractive power, and at least one lens of the optical lens has an Abbe number of greater than 60;
   (2) an F-number of the optical lens is larger than 1.6.

5. The optical lens as claimed in claim 1, wherein the second lens group satisfies one of the following conditions:
   (1) the second lens group comprises a doublet lens or a triplet lens;
   (2) a minimum distance between two lenses of the second lens group along an optical axis is smaller than 0.05 mm;
   (3) the second lens group comprises a triplet lens with refractive powers of positive, negative and positive;
   (4) the second lens group comprises a triplet lens with refractive powers of negative, positive and negative.

6. The optical lens as claimed in claim 1, wherein the optical lens satisfies one of the following conditions:
   (1) the third lens has a biconcave shape or a meniscus shape;
   (2) the first lens group has an aspheric lens with a negative refractive power;
   (3) the second lens group has at least one aspheric lens.

7. The optical lens as claimed in claim 1, wherein the optical lens satisfies one of the following conditions:
   (1) the optical lens has eight lenses with refractive powers of negative, negative, negative, positive, positive, negative, positive and positive;
   (2) the optical lens has eight lenses with refractive powers of negative, negative, negative, positive, negative, positive, negative and positive;
   (3) the optical lens has nine lenses with refractive powers of negative, negative, negative, positive, positive, positive, negative, positive and positive.

8. The optical lens as claimed in claim 1, wherein 555 nm visible light passes the optical lens to form a first focal plane, the first focal plane crosses an optical axis of the optical lens to form a first intersection, 850 nm infrared light passes the optical lens to form a second focal plane, the second focal plane crosses the optical axis of the optical lens to form a second intersection, and a displacement between the first intersection and the second intersection is smaller than 10 μm.

9. The optical lens as claimed in claim 1, wherein the optical lens satisfies one of the following conditions:
   (1) the optical lens has eight lenses having respective shapes of meniscus, meniscus, biconcave, biconvex, meniscus, biconcave, biconvex and biconvex;
   (2) the optical lens has eight lenses having respective shapes of meniscus, meniscus, meniscus, biconvex, meniscus, biconvex, meniscus and biconvex;
   (3) the optical lens has eight lenses having respective shapes of meniscus, meniscus, meniscus, biconvex, biconcave, biconvex and meniscus;
   (4) the optical lens has eight lenses having respective shapes of meniscus, meniscus, meniscus, biconvex, biconvex, biconcave, biconvex and biconvex;

(5) the optical lens has nine lenses having respective shapes of meniscus, meniscus, biconcave, meniscus, meniscus, biconvex, biconcave, biconvex and biconvex.

10. An optical lens comprising in order from a magnified side to a minified side:
a first lens group, an aperture stop and a second lens group, the first lens group having a negative refractive power, the second lens group having a positive refractive power, the first lens group comprising a first lens with a negative refractive power, a second lens with a refractive power and a third lens with a negative refractive power, the first lens being nearest the magnified side, the optical lens having at most nine lenses with refractive powers that include at most three aspheric lenses, and the optical lens satisfying the conditions:
0.146<IH/TTL<0.174 and 0.023<IH/FOV<0.026, where IH is a semi-diagonal image height on an image plane that equals half of an image circle, TTL is a total track length that is a distance along an optical axis between a surface of the first lens facing the magnified side and a surface of a last lens facing the minified side, the last lens is nearest the minified side as compared with any other lens of the optical lens, and FOV is a full field of view of the optical lens.

11. The optical lens as claimed in claim 10, wherein the total track length of the optical lens is smaller than 30 mm.

12. The optical lens as claimed in claim 10, wherein the full field of view of the optical lens is greater than 180 degrees.

13. The optical lens as claimed in claim 10, wherein the optical lens satisfies one of the following conditions:
(1) the second lens has a negative refractive power, and at least one lens of the optical lens has an Abbe number of greater than 60;
(2) an F-number of the optical lens is larger than 1.6.

14. The optical lens as claimed in claim 10, wherein the second lens group satisfies one of the following conditions:
(1) the second lens group comprises a doublet lens or a triplet lens;
(2) a minimum distance between two lenses of the second lens group along the optical axis is smaller than 0.05 mm;
(3) the second lens group comprises a triplet lens with refractive powers of positive, negative and positive;
(4) the second lens group comprises a triplet lens with refractive powers of negative, positive and negative.

15. The optical lens as claimed in claim 10, wherein the optical lens satisfies one of the following conditions:
(1) the third lens has a biconcave shape or a meniscus shape;
(2) the first lens group has an aspheric lens with a negative refractive power;
(3) the second lens group has at least one aspheric lens.

16. The optical lens as claimed in claim 10, wherein the optical lens satisfies one of the following conditions:
(1) the optical lens has eight lenses with refractive powers of negative, negative, negative, positive, positive, negative, positive and positive;
(2) the optical lens has eight lenses with refractive powers of negative, negative, negative, positive, negative, positive, negative and positive;
(3) the optical lens has nine lenses with refractive powers of negative, negative, negative, positive, positive, positive, negative, positive and positive.

17. The optical lens as claimed in claim 10, wherein 555 nm visible light passes the optical lens to form a first focal plane, the first focal plane crosses the optical axis of the optical lens to form a first intersection, 850 nm infrared light passes the optical lens to form a second focal plane, the second focal plane crosses the optical axis of the optical lens to form a second intersection, and a displacement between the first intersection and the second intersection is smaller than 10 μm.

18. The optical lens as claimed in claim 10, wherein the optical lens satisfies one of the following conditions:
(1) the optical lens has eight lenses having respective shapes of meniscus, meniscus, biconcave, biconvex, meniscus, biconcave, biconvex and biconvex;
(2) the optical lens has eight lenses having respective shapes of meniscus, meniscus, meniscus, biconvex, meniscus, biconvex, meniscus and biconvex;
(3) the optical lens has eight lenses having respective shapes of meniscus, meniscus, meniscus, biconvex, biconvex, biconcave, biconvex and meniscus;
(4) the optical lens has eight lenses having respective shapes of meniscus, meniscus, meniscus, biconvex, biconvex, biconcave, biconvex and biconvex;
(5) the optical lens has nine lenses having respective shapes of meniscus, meniscus, biconcave, meniscus, meniscus, biconvex, biconcave, biconvex and biconvex.

19. A fabrication method of an optical lens, comprising the steps of:
providing a lens barrel;
placing and fixing a first lens group inside the lens barrel, the first lens group having a negative refractive power and comprising, in order from a first side to a second side, a first lens with a negative refractive power, a second lens with a refractive power and a third lens with a negative refractive power; and
placing and fixing a second lens group inside the lens barrel, the second lens group having a positive refractive power and being disposed between the first lens group and the second side, wherein the optical lens has at most nine lenses that include at most three aspheric lenses, and the optical lens satisfies the conditions:
2.1<D1/D3<3.0 and 1.9<D1/DL<3.2, where D1 is a diameter of a surface of the first lens facing the first side, D3 is a diameter of a surface of the third lens facing the first side, DL is a diameter of a surface of a last lens facing the second side, and the last lens is nearest the second side as compared with any other lens of the optical lens.

20. The fabrication method as claimed in claim 19, wherein the optical lens satisfies the conditions:
0.146<IH/TTL<0.174 and 0.023<IH/FOV<0.026, where IH is a semi-diagonal image height on an image plane, TTL is a total track length that is a distance along an optical axis between a surface of the first lens facing the magnified side and a surface of the last lens facing the minified side, and FOV is a full field of view of the optical lens.

* * * * *